United States Patent
Sakimoto et al.

(10) Patent No.: US 12,465,967 B2
(45) Date of Patent: Nov. 11, 2025

(54) STEEL PIPE COLLAPSE STRENGTH PREDICTION MODEL GENERATION METHOD, STEEL PIPE COLLAPSE STRENGTH PREDICTION METHOD, STEEL PIPE MANUFACTURING CHARACTERISTICS DETERMINATION METHOD, AND STEEL PIPE MANUFACTURING METHOD

(71) Applicant: JFE STEEL CORPORATION, Tokyo (JP)

(72) Inventors: Takahiro Sakimoto, Tokyo (JP); Hisakazu Tajika, Tokyo (JP); Tsunehisa Handa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 427 days.

(21) Appl. No.: 17/925,762

(22) PCT Filed: Feb. 8, 2021

(86) PCT No.: PCT/JP2021/004588
§ 371 (c)(1),
(2) Date: Nov. 16, 2022

(87) PCT Pub. No.: WO2021/240900
PCT Pub. Date: Dec. 2, 2021

(65) Prior Publication Data
US 2023/0191466 A1    Jun. 22, 2023

(30) Foreign Application Priority Data
May 26, 2020    (JP) ................. 2020-091127

(51) Int. Cl.
*B21C 37/08*    (2006.01)
*B21C 37/06*    (2006.01)
(Continued)

(52) U.S. Cl.
CPC .............. *B21C 37/08* (2013.01); *B21C 37/06* (2013.01); *G01N 3/00* (2013.01); *G01N 3/08* (2013.01);
(Continued)

(58) Field of Classification Search
CPC .......... B21C 37/08; B21C 37/06; G01N 3/00; G01N 2203/0016; G01N 2203/0067;
(Continued)

(56) References Cited

U.S. PATENT DOCUMENTS 7,132,617 B2    11/2006 Lee et al.
7,516,022 B2    4/2009 Lee et al.
(Continued)

FOREIGN PATENT DOCUMENTS

CN    101701315 A    5/2010
EP    3 042 976 A1    7/2016
(Continued)

OTHER PUBLICATIONS

Djerrad et al. (Experimental and FEM analysis of AFRP strengthened short and long steel tube under axial compression, Thin-Walled Structures, vol. 139, 2019, pp. 9-23, ISSN 0263-8231, https://doi.org/10.1016/j.tws.2019.02.032.) (Year: 2019).*
(Continued)

*Primary Examiner* — Lisa M Caputo
*Assistant Examiner* — Christian T Bryant
(74) *Attorney, Agent, or Firm* — Oliff PLC

(57) ABSTRACT

A steel pipe collapse strength prediction model generation method, a steel pipe collapse strength prediction method, a steel pipe manufacturing characteristics determination method, and a steel pipe manufacturing method capable of highly accurately predicting the collapse strength of a steel pipe after forming or a coated steel pipe in consideration of the pipe-making strain during forming. Into a steel pipe
(Continued)

collapse strength prediction model generated by the prediction model generation method, steel pipe manufacturing characteristics including the shape of a steel pipe to be predicted after forming, strength characteristics, and the pipe-making strain are input to predict the collapse strength after forming. Into a steel pipe collapse strength prediction model, steel pipe manufacturing characteristics including the shape of a coated steel pipe to be predicted after forming, strength characteristics, the pipe-making strain, and coating conditions are input to predict the collapse strength of the coated steel pipe.

8 Claims, 5 Drawing Sheets

(51) Int. Cl.
| | |
|---|---|
| *G01N 3/00* | (2006.01) |
| *G01N 3/08* | (2006.01) |
| *G05B 13/02* | (2006.01) |
| *G05B 19/418* | (2006.01) |
| *G06F 30/10* | (2020.01) |
| *G06F 30/27* | (2020.01) |
| *G06N 3/04* | (2023.01) |
| *G06N 3/08* | (2023.01) |
| *G06N 20/00* | (2019.01) |

(52) U.S. Cl.
CPC ............... *G01N 2203/0016* (2013.01); *G01N 2203/0067* (2013.01); *G01N 2203/0075* (2013.01); *G01N 2203/0216* (2013.01); *G01N 2203/0274* (2013.01); *G01N 2203/0298* (2013.01); *G05B 13/027* (2013.01); *G05B 19/41875* (2013.01); *G05B 2219/32193* (2013.01); *G06F 30/10* (2020.01); *G06F 30/27* (2020.01); *G06N 3/04* (2013.01); *G06N 3/08* (2013.01); *G06N 20/00* (2019.01)

(58) Field of Classification Search
CPC ... G01N 2203/0075; G01N 2203/0216; G01N 2203/0274; G01N 2203/0298; G01N 3/08; G05B 2219/32193; G05B 19/41875; G05B 13/027; G06N 3/08; G06N 3/04; G06N 20/00; G06F 30/10; G06F 30/27
See application file for complete search history.

(56) References Cited

U.S. PATENT DOCUMENTS

| | | |
|---|---|---|
| 7,892,368 B2 | 2/2011 | Tsuru et al. |
| 7,967,926 B2 | 6/2011 | Tsuru et al. |
| 11,017,054 B2 | 5/2021 | Nagata et al. |
| 2003/0234239 A1 | 12/2003 | Lee et al. |
| 2005/0178456 A1 | 8/2005 | Tsuru et al. |
| 2007/0038400 A1 | 2/2007 | Lee et al. |
| 2009/0320965 A1 | 12/2009 | Tsuru et al. |
| 2016/0203239 A1* | 7/2016 | Samuel ............... E21B 43/10 703/1 |
| 2020/0034403 A1 | 1/2020 | Nagata et al. |

FOREIGN PATENT DOCUMENTS

| | | |
|---|---|---|
| EP | 3 042 976 B1 | 5/2020 |
| JP | H06-259107 A | 9/1994 |
| JP | 2001-349883 A | 12/2001 |
| JP | 2012-006069 A | 1/2012 |
| JP | 2014-222160 A | 11/2014 |
| WO | 03/099482 A1 | 12/2003 |
| WO | 2015/030210 A1 | 3/2015 |
| WO | 2018/074433 A1 | 4/2018 |

OTHER PUBLICATIONS

McCann et al. (âNumerical Analysis of Hot Polymer-Coated Steel Pipeline Joints in Bendingâ, Finite Element Method—Simulation, Numerical Analysis and Solution Techniques. InTech, Feb. 28, 2018. doi: 10.5772/intechopen.72262.) (Year: 2018).*
Ridhiman Alloys (3LPE Steel Pipe Coating and Its Advantages in the Pipeline Industry, Ridhiman Alloys Blog, Feb. 11, 2020, https://ridhimanalloys.home.blog/2020/02/11/3lpe-steel-pipe-coating-and-its-advantages-in-the-pipeline-industry/) (Year: 2020).*
Oct. 25, 2023 Extended European Search Report issued in European Patent Application No. 21813944.2.
Yu Jian-Xing et al: "A modified numerical calculation method of collapse pressure for thick-walled offshore pipelines", Applied Ocean Research, Elsevier, Amsterdam, NL, vol. 91, (2019), pp. 1-12.
Mar. 23, 2021 International Search Report issued in International Patent Application No. PCT/JP2021/004588.
Nov. 17, 2022 International Preliminary Report on Patentability issued in International Patent Application No. PCT/JP2021/004588.
Det Norske Veritas. "Offshore Standard DNV-OS-F101". Submarine Pipeline Systems, Oct. 2010, pp. 1-238.
Djerrad, Abderrahim et al. "Artificial Neural Networks (ANN) Based Compressive Strength Prediction of AFRP Strengthened Steel Tube". International Journal of Steel Structures, 2020, vol. 20, No. 1, pp. 156-174.
Fujii, Katashi et al. "A Prediction Method of Strength Deterioration in Aging of Circular Steel Tube Corroded in Marine Environment". Journal of Japan Society of Civil Engineers, Ser. A, Mar. 2010, vol. 66, No. 1, pp. 92-105.
Feb. 22, 2022 Office Action issued in Japanese Patent Application No. 2021-519178.
Nov. 24, 2021 Office Action issued in Japanese Patent Application No. 2021-519178.
Jun. 3, 2022 Decision to Grant a Patent issued in Japanese Patent Application No. 2021-519178.

* cited by examiner

STEEL PIPE COLLAPSE STRENGTH PREDICTION MODEL GENERATION METHOD, STEEL PIPE COLLAPSE STRENGTH PREDICTION METHOD, STEEL PIPE MANUFACTURING CHARACTERISTICS DETERMINATION METHOD, AND STEEL PIPE MANUFACTURING METHOD

TECHNICAL FIELD

The present invention relates to a steel pipe collapse strength prediction model generation method, a steel pipe collapse strength prediction method, a steel pipe manufacturing characteristics determination method, and a steel pipe manufacturing method.

BACKGROUND ART

Some steel pipes used in an environment where an external pressure is applied may cause collapse due to the external pressure. For example, in submarine pipelines, if a steel pipe (a line pipe) causes such collapse, the collapse leads to structure damage or destruction and significantly affects economics or the environment. Hence, steel pipes having high anti-collapse performance are demanded as the steel pipe used where a high compressive stress is applied, such as submarine pipelines.

As a method of evaluating/predicting anti-collapse performance, for example, NPL 1 discloses a method of predicting/evaluating the anti-collapse performance of an intended steel pipe. NPL 1 defines standards including DNV-F01 as the method of predicting/evaluating the anti-collapse performance of an intended steel pipe and has proposed a formula for predicting the anti-collapse performance from data including the ovality of the outer circumferential shape of a steel pipe to be evaluated (steel pipe after steel pipe forming), the yield stress (stress at a strain of 0.5%) at the center of the wall thickness of a material or at ¼ (from the inner face) of the wall thickness, the Young's modulus, and the Poisson's ratio (D Chapter 400, Local Buckling-External over pressure only, Section 401, Formula (5.10)).

CITATION LIST

Non Patent Literature

NPL 1: OFFSHORE STANDARD DNV-OS-F101, SUBMARINE PIPELINE SYSTEMS, DET NORSKE VERITAS, 2010, October, SEC 5, p 41-56

SUMMARY OF INVENTION

Technical Problem

The method of predicting/evaluating the anti-collapse performance of an intended steel pipe according to NPL 1, however, has the following problems.

In other words, the steel pipe collapse strength depends on not only the steel pipe shape after steel pipe forming and the strength characteristics (including the tensile strength, the compressive strength, the Young's modulus, and the Poisson's ratio) of a steel pipe after steel pipe forming but also the pipe-making strain during steel pipe forming (strain history during steel pipe forming). This is because the pipe-making strain during steel pipe forming greatly affects the steel pipe shape after steel pipe forming and the strength characteristics of a steel pipe after steel pipe forming. NPL 1, however, does not consider the pipe-making strain during steel pipe forming and predicts the collapse strength of a steel pipe with insufficient accuracy. The predicted collapse strength of a steel pipe fails to match the actually measured collapse strength of the steel pipe, and the difference between them is large. Such prediction may result in an excessively safe design when a steel pipe is designed or may lead to collapse at a lower external pressure than a predicted pressure to result in a serious accident.

The present invention is therefore intended to solve the related art problems and to provide a steel pipe collapse strength prediction model generation method, a steel pipe collapse strength prediction method, a steel pipe manufacturing characteristics determination method, and a steel pipe manufacturing method capable of highly accurately predicting the collapse strength of a steel pipe after steel pipe forming or of a coated steel pipe coated after steel pipe forming in consideration of the pipe-making strain during steel pipe forming.

Solution to Problem

To solve the problem, a steel pipe collapse strength prediction model generation method pertaining to an aspect of the present invention includes performing machine learning of a plurality of learning data that include, as input data, previous steel pipe manufacturing characteristics including the steel pipe shape after steel pipe forming, steel pipe strength characteristics after steel pipe forming, and the pipe-making strain during steel pipe forming and, as an output datum for the input data, the previous collapse strength of the steel pipe after steel pipe forming, to generate a steel pipe collapse strength prediction model that predicts the collapse strength of a steel pipe after steel pipe forming.

A steel pipe collapse strength prediction method pertaining to another aspect of the present invention includes inputting, into a steel pipe collapse strength prediction model generated by the above steel pipe collapse strength prediction model generation method, steel pipe manufacturing characteristics including the steel pipe shape of a steel pipe to be predicted after steel pipe forming, steel pipe strength characteristics after steel pipe forming, and the pipe-making strain during steel pipe forming, to predict the collapse strength of the steel pipe after steel pipe forming.

A steel pipe manufacturing characteristics determination method pertaining to another aspect of the present invention includes sequentially changing at least one of the steel pipe shape after steel pipe forming, the steel pipe strength characteristics after steel pipe forming, and the pipe-making strain during steel pipe forming included in steel pipe manufacturing characteristics such that the predicted collapse strength of a steel pipe after steel pipe forming by the above steel pipe collapse strength prediction method asymptotically approaches the requested collapse strength of an intended steel pipe after steel pipe forming, to determine the optimum steel pipe manufacturing characteristics.

A steel pipe manufacturing method pertaining to another aspect of the present invention includes a steel pipe forming step of forming a steel pipe, a collapse strength prediction step of predicting the collapse strength of the steel pipe formed in the forming step, by the above steel pipe collapse strength prediction method, and a performance predictive value assignment step of assigning the steel pipe collapse strength predicted in the collapse strength prediction step to the steel pipe formed in the forming step.

A steel pipe manufacturing method pertaining to another aspect of the present invention includes determining steel pipe manufacturing conditions in accordance with the optimum steel pipe manufacturing characteristics determined by the above steel pipe manufacturing characteristics determination method, and manufacturing a steel pipe under the determined steel pipe manufacturing conditions.

A steel pipe collapse strength prediction model generation method pertaining to another aspect of the present invention includes performing machine learning of a plurality of learning data that includes, as input data, previous steel pipe manufacturing characteristics including the steel pipe shape after steel pipe forming, steel pipe strength characteristics after steel pipe forming, the pipe-making strain during steel pipe forming, and coating conditions and, as an output data for the input data, the previous collapse strength of the coated steel pipe coated after steel pipe forming, to generate a steel pipe collapse strength prediction model that predicts the collapse strength of a coated steel pipe coated after steel pipe forming.

A steel pipe collapse strength prediction method pertaining to another aspect of the present invention includes inputting, into a steel pipe collapse strength prediction model generated by the above steel pipe collapse strength prediction model generation method, steel pipe manufacturing characteristics including the steel pipe shape of a coated steel pipe to be predicted after steel pipe forming, steel pipe strength characteristics after steel pipe forming, the pipe-making strain during steel pipe forming, and coating conditions, to predict the collapse strength of the coated steel pipe coated after steel pipe forming.

A steel pipe manufacturing characteristics determination method pertaining to another aspect of the present invention includes sequentially changing at least one of the steel pipe shape after steel pipe forming, the steel pipe strength characteristics after steel pipe forming, the pipe-making strain during steel pipe forming, and the coating conditions included in steel pipe manufacturing characteristics such that the predicted collapse strength of a coated steel pipe by the above steel pipe collapse strength prediction method asymptotically approaches the requested collapse strength of an intended coated steel pipe, to determine the optimum steel pipe manufacturing characteristics.

A steel pipe manufacturing method pertaining to another aspect of the present invention includes a coated steel pipe forming step of forming a steel pipe and coating the formed steel pipe to form a coated steel pipe, a collapse strength prediction step of predicting the collapse strength of the coated steel pipe formed in the coated steel pipe forming step, by the above steel pipe collapse strength prediction method, and a performance predictive value assignment step of assigning the coated steel pipe collapse strength predicted in the collapse strength prediction step to the coated steel pipe formed in the coated steel pipe forming step.

A steel pipe manufacturing method pertaining to another aspect of the present invention includes determining coated steel pipe manufacturing conditions in accordance with the optimum steel pipe manufacturing characteristics determined by the above steel pipe manufacturing characteristics determination method, and manufacturing a coated steel pipe under the determined coated steel pipe manufacturing conditions.

Advantageous Effects of Invention

According to the steel pipe collapse strength prediction model generation method, the steel pipe collapse strength prediction method, the steel pipe manufacturing characteristics determination method, and the steel pipe manufacturing method pertaining to the present invention, a steel pipe collapse strength prediction model generation method, a steel pipe collapse strength prediction method, a steel pipe manufacturing characteristics determination method, and a steel pipe manufacturing method capable of highly accurately predicting the collapse strength of a steel pipe after steel pipe forming or of a coated steel pipe coated after steel pipe forming in consideration of the pipe-making strain during steel pipe forming can be provided.

DESCRIPTION OF EMBODIMENTS

Embodiments of the present invention will now be described with reference to drawings. The following embodiments are illustrative examples of apparatuses and methods for embodying the technical idea of the present invention, and the technical idea of the present invention is not limited to the following embodiments in terms of the materials, the shapes, the structures, the configurations, and the like of components. The drawings are schematic. Hence, it should be noted that the relations, ratios, and the like between thicknesses and plan dimensions may differ from those in reality, and the relations and ratios may differ among the drawings.

First Embodiment

Figure 1:
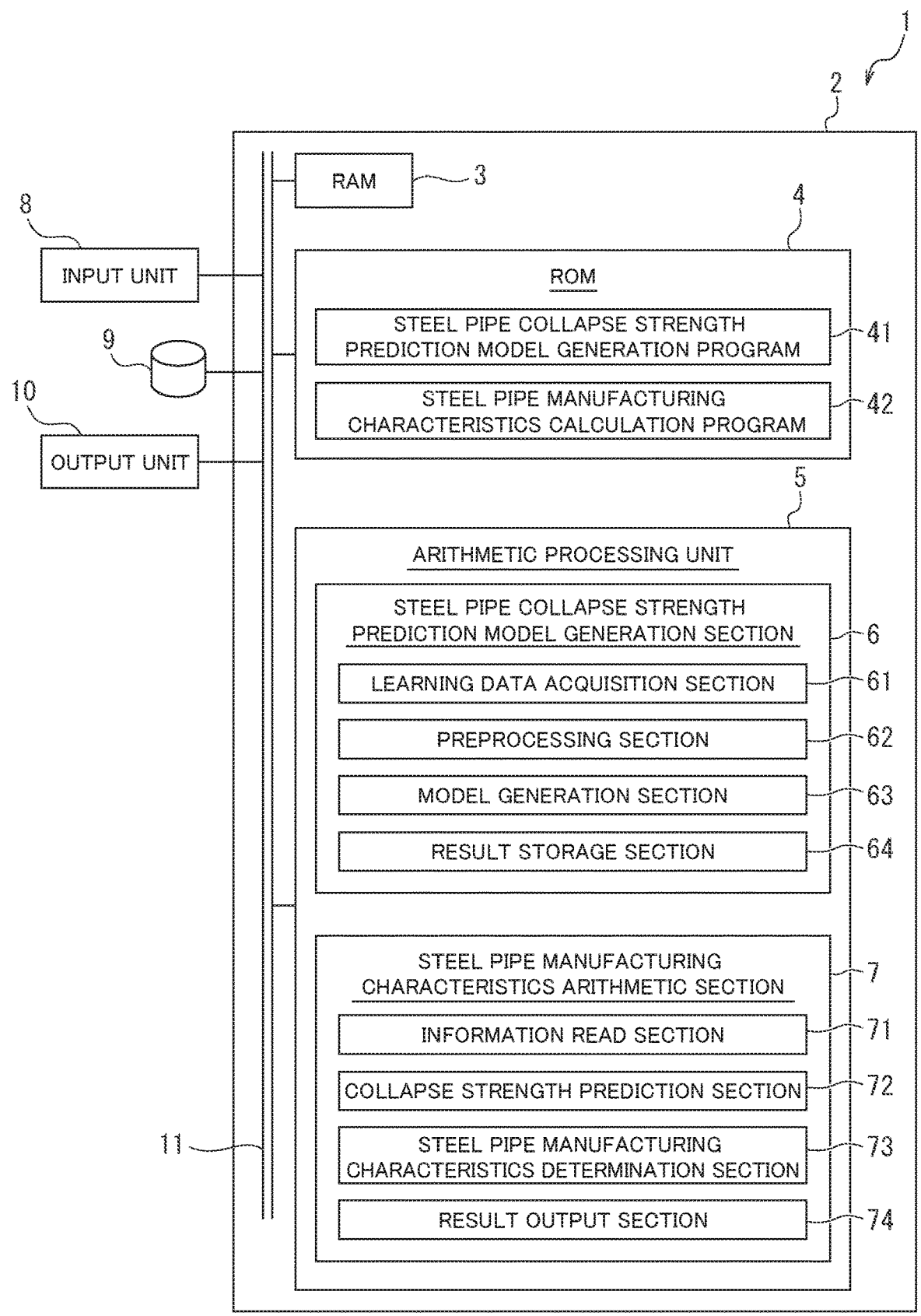
FIG. 1 is a functional block diagram of a schematic configuration of a steel pipe manufacturing characteristics determination apparatus to which steel pipe collapse strength prediction model generation methods, steel pipe collapse strength prediction methods, and steel pipe manufacturing characteristics determination methods pertaining to first and second embodiments of the present invention are applied.

FIG. 1 illustrates a functional block diagram of a schematic configuration of a steel pipe manufacturing characteristics determination apparatus to which a steel pipe collapse strength prediction model generation method, a steel pipe collapse strength prediction method, and a steel pipe manufacturing characteristics determination method pertaining to a first embodiment of the present invention are applied.

A steel pipe manufacturing characteristics determination apparatus 1 illustrated in FIG. 1 and pertaining to the first embodiment generates a steel pipe collapse strength prediction model and predicts the collapse strength of a steel pipe after steel pipe forming by using the generated steel pipe collapse strength prediction model. The steel pipe manufacturing characteristics determination apparatus 1 also determines the optimum steel pipe manufacturing characteristics such that the predicted collapse strength of a steel pipe after steel pipe forming asymptotically approaches the requested collapse strength of an intended steel pipe after steel pipe forming.

The steel pipe manufacturing characteristics determination apparatus 1 illustrated in FIG. 1 is a computer system including an arithmetic unit 2, an input unit 8, a storage unit 9, and an output unit 10. The arithmetic unit 2 includes a RAM 3, a ROM 4, and an arithmetic processing unit 5, as described later. The RAM 3, the ROM 4, and the arithmetic processing unit 5 are connected to the input unit 8, the storage unit 9, and the output unit 10 through a bus 11. The connection manner of the arithmetic unit 2 to the input unit 8, the storage unit 9, and the output unit 10 is not limited to this and may be a wireless connection or may be a combination of wired and wireless connections.

The input unit 8 functions as an input port to which various information is input by an operator of the system, such as a keyboard, a pen tablet, a touchpad, and a mouse. Into the input unit 8, for example, a steel pipe collapse strength prediction model generation command, a steel pipe manufacturing characteristics arithmetic command, steel pipe manufacturing characteristics including the steel pipe shape of a steel pipe the collapse strength of which is to be predicted, after steel pipe forming, steel pipe strength characteristics after steel pipe forming, and the pipe-making strain during steel pipe forming, the collapse strength of an intended steel pipe after steel pipe forming, and steel pipe manufacturing characteristics determination mode information are input.

In the description, a steel pipe is typically manufactured by bending and forming a plate-like steel sheet into a tubular shape, and the surface may be further coated.

Of the steel pipe manufacturing characteristics input into the input unit 8, the steel pipe shape after steel pipe forming means the shape of a steel pipe after a steel sheet is formed into a tubular shape. The steel pipe shape after steel pipe forming specifically includes the maximum outer diameter Dmax (mm) of a steel pipe, the minimum outer diameter Dmin (mm) of a steel pipe, the average outer diameter Dave (mm) of a steel pipe, the average thickness t (mm) of a steel pipe, and the roundness (ovality) fO (%) of the outer circumferential shape of a steel pipe. As the steel pipe shape after steel pipe forming, actually measured values are input into the input unit 8. The steel pipe shape after steel pipe forming greatly affects the collapse strength of a steel pipe to be predicted after steel pipe forming and thus is input.

The collapse strength of a steel pipe means the applied stress (MPa) at which the steel pipe causes collapse, and the "collapse" in the description means a condition in which the applied stress reaches a maximum value, and a steel pipe is deformed to such an extent as not to maintain the shape against the external pressure.

The steel pipe strength characteristics after steel pipe forming mean strength characteristics of a steel pipe after a steel sheet is formed into a tubular shape. The steel pipe strength characteristics after steel pipe forming are specifically the Young's modulus E (GPa) of a steel pipe, the Poisson's ratio μ (-) of a steel pipe, the tensile strength YS (MPa) of a steel pipe, the compressive strength 0.23% YS (stress at a strain of 0.23%) of a steel pipe, and the compressive strength 0.5% YS (stress at a strain of 0.5%) of a steel pipe. The steel pipe strength characteristics after steel pipe forming greatly affect the collapse strength of a steel pipe to be predicted after steel pipe forming and thus are input. As the steel pipe strength characteristics after steel pipe forming, values simulated from strength characteristics of a steel sheet before steel pipe forming by finite element analysis or actually measured values are input.

The pipe-making strain during steel pipe forming is a tensile strain (%) or a compression strain (%) during steel pipe forming. The pipe-making strain during steel pipe forming greatly affects the steel pipe shape after steel pipe forming and the steel pipe strength characteristics after steel pipe forming to greatly affects the collapse strength of a steel pipe to be predicted after steel pipe forming and thus is input. As the pipe-making strain during steel pipe forming, a value forming-simulated from strength characteristics of a steel sheet before steel pipe forming by finite element analysis or an actually measured value is input.

The storage unit 9, for example, includes a hard disk drive, a semiconductor drive, or an optical drive and is a device to store information needed in the system (information needed to achieve the functions of the steel pipe collapse strength prediction model generation section 6 and the steel pipe manufacturing characteristics arithmetic section 7 described later).

In the embodiment, examples of the information needed to achieve the function by the steel pipe collapse strength prediction model generation section 6 include a plurality of learning data that include, as input data, previous steel pipe manufacturing characteristics including the steel pipe shape after steel pipe forming, steel pipe strength characteristics after steel pipe forming, and the pipe-making strain during steel pipe forming and, as an output datum for the input data, the previous collapse strength of the steel pipe after steel pipe forming.

Examples of the information needed to achieve the function by the steel pipe manufacturing characteristics arithmetic section 7 include a steel pipe collapse strength prediction model generated by the steel pipe collapse strength prediction model generation section 6, steel pipe manufacturing characteristics that include the steel pipe shape of a steel pipe the collapse strength of which is to be predicted, after steel pipe forming, steel pipe strength characteristics after steel pipe forming, and the pipe-making strain during steel pipe forming, are input into the input unit 8, and are to be input into a steel pipe collapse strength prediction model, the collapse strength of an intended steel pipe after steel pipe forming, and steel pipe manufacturing characteristics determination mode information (information whether a mode is for determining the optimum steel pipe manufacturing characteristics).

The output unit 10 functions as an output port to output output data from the arithmetic unit 2, such as information of the steel pipe collapse strength (predictive value) after steel pipe forming predicted by the collapse strength prediction section 72 described later and information of the optimum steel pipe manufacturing characteristics deter-mined by the steel pipe manufacturing characteristics determination section 73. The output unit 10 includes any display such as a liquid crystal display and an organic display and thus can display a screen page based on output data.

Next, the arithmetic unit 2 includes a RAM 3, a ROM 4, and an arithmetic processing unit 5 as illustrated in FIG. 1. The ROM 4 stores a steel pipe collapse strength prediction model generation program 41 and a steel pipe manufacturing characteristics calculation program 42. The arithmetic processing unit 5 has an arithmetic processing function and is connected to the RAM 3 and the ROM 4 through a bus 11. The RAM 3, the ROM 4, and the arithmetic processing unit 5 are connected through the bus 11 to the input unit 8, the storage unit 9, and the output unit 10.

The arithmetic processing unit 5 includes, as functional blocks, a steel pipe collapse strength prediction model generation section 6 and a steel pipe manufacturing characteristics arithmetic section 7.

The steel pipe collapse strength prediction model generation section 6 of the arithmetic processing unit 5 performs machine learning of a plurality of learning data that are stored in the storage unit 9 and include, as input data, previous steel pipe manufacturing characteristics including the steel pipe shape after steel pipe forming, steel pipe strength characteristics after steel pipe forming, and the pipe-making strain during steel pipe forming and, as an output datum for the input data, the previous collapse strength of the steel pipe after steel pipe forming, to generate a steel pipe collapse strength prediction model. The machine learning method is a neural network, and the steel pipe collapse strength prediction model is a prediction model constructed by the neural network.

In the embodiment, the steel pipe collapse strength prediction model generation section 6 includes, as functional blocks, a learning data acquisition section 61, a preprocessing section 62, a model generation section 63, and a result storage section 64. On receiving a steel pipe collapse strength prediction model generation command by inputting the steel pipe collapse strength prediction model generation command into the input unit 8, the steel pipe collapse strength prediction model generation section 6 executes the steel pipe collapse strength prediction model generation program 41 stored in the ROM 4 and executes each function of the learning data acquisition section 61, the preprocessing section 62, the model generation section 63, and the result storage section 64. After every execution of the functions by the steel pipe collapse strength prediction model generation section 6, the steel pipe collapse strength prediction model is updated.

The execution of each function of the learning data acquisition section 61, the preprocessing section 62, the model generation section 63, and the result storage section 64 by the steel pipe collapse strength prediction model generation section 6 corresponds to the steel pipe collapse strength prediction model generation method that pertains to the first embodiment of the present invention and performs machine learning of a plurality of learning data that include, as input data, previous steel pipe manufacturing characteristics including the steel pipe shape after steel pipe forming, steel pipe strength characteristics after steel pipe forming, and the pipe-making strain during steel pipe forming and, as an output datum for the input data, the previous collapse strength of the steel pipe after steel pipe forming, to generate a steel pipe collapse strength prediction model that predicts the steel pipe collapse strength after steel pipe forming.

In the embodiment, the learning data acquisition section 61 acquires a plurality of learning data that are stored in the storage unit 9 and include, as input data, previous steel pipe manufacturing characteristics including the steel pipe shape after steel pipe forming, steel pipe strength characteristics after steel pipe forming, and the pipe-making strain during steel pipe forming and, as an output datum for the input data, the previous collapse strength of the steel pipe after steel pipe forming. Each learning datum is a set of input data and an output datum.

The preprocessing section 62 processes the plurality of learning data acquired by the learning data acquisition section 61 into data for generating a steel pipe collapse strength prediction model. Specifically, the preprocessing section 62 standardizes (normalizes) actual information of previous steel pipe manufacturing characteristics including the steel pipe shape after steel pipe forming, steel pipe strength characteristics after steel pipe forming, and the pipe-making strain during steel pipe forming included in the learning data, between 0 and 1 so as to be read by a neural network model.

The model generation section 63 generates a steel pipe collapse strength prediction model that performs machine learning of the plurality of learning data that have been preprocessed by the preprocessing section 62 and include, as input data, previous steel pipe manufacturing characteristics including the steel pipe shape after steel pipe forming, steel pipe strength characteristics after steel pipe forming, and the pipe-making strain during steel pipe forming and, as an output datum, the previous collapse strength of the steel pipe after steel pipe forming. In the present embodiment, a neural network is adopted as the machine learning method, and thus a neural network model is generated as the steel pipe collapse strength prediction model. In other words, the model generation section 63 creates a neural network model as the steel pipe collapse strength prediction model that links the actual input data in learning data processed for generating a steel pipe collapse strength prediction model (actual data of previous steel pipe manufacturing characteristics) to the actual output data (actual data of the previous collapse strength of the steel pipe after steel pipe forming). The neural network model is expressed, for example, by a function formula.

Specifically, the model generation section 63 sets hyperparameters used in the neural network model and performs learning by the neural network model using the hyperparameters. As the hyperparameters, typically, the number of hidden layers, the number of neurons in each hidden layer, the dropout rate in each hidden layer, and the activation function in each hidden layer are set, but the hyperparameters are not limited to them.

Figure 2:
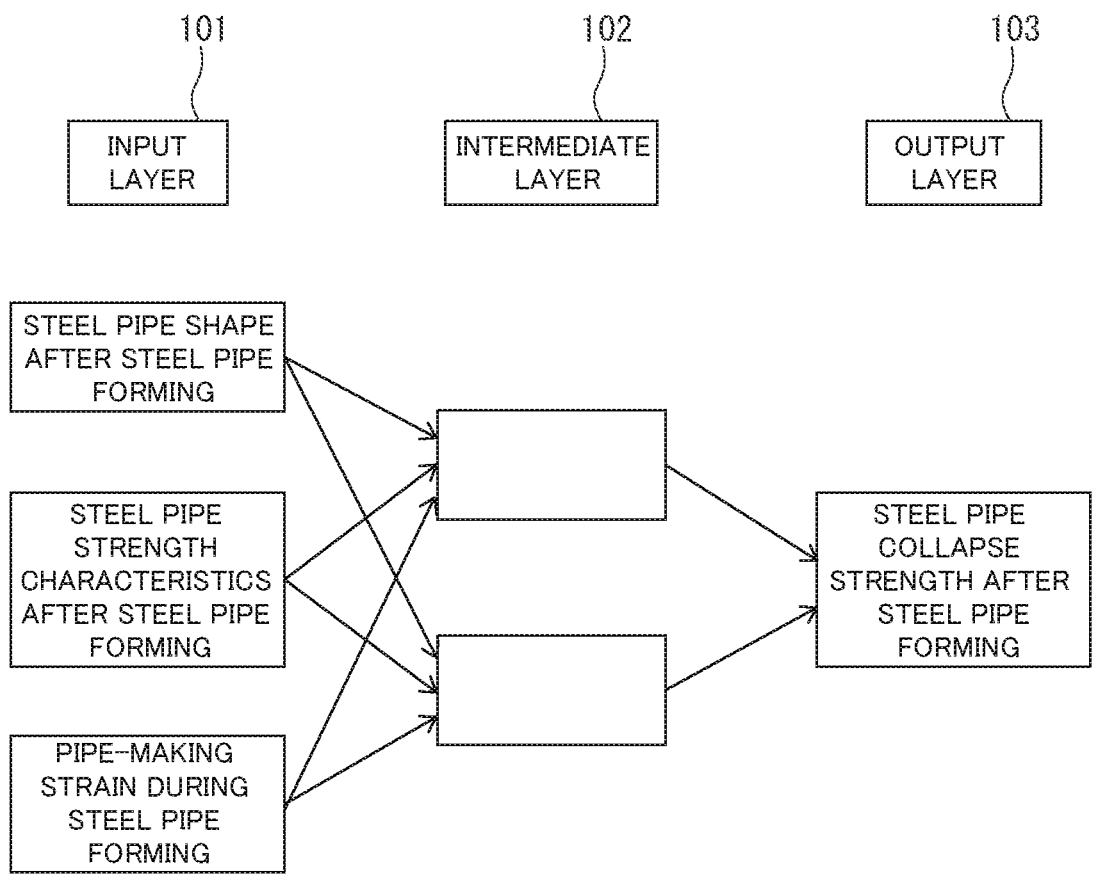
FIG. 2 is a view illustrating a processing flow of a steel pipe collapse strength prediction model as a neural network model generated by the steel pipe collapse strength prediction model generation method pertaining to the first embodiment of the present invention.

FIG. 2 illustrates a processing flow of a steel pipe collapse strength prediction model as a neural network model generated by the steel pipe collapse strength prediction model generation method pertaining to the first embodiment of the present invention.

The steel pipe collapse strength prediction model as a neural network model includes an input layer 101, an intermediate layer 102, and an output layer 103 sequentially from the input side.

When the model generation section 63 performs learning by a neural network model using hyperparameters, the input layer 101 stores the actual information of previous steel pipe manufacturing characteristics including the steel pipe shape after steel pipe forming, steel pipe strength characteristics after steel pipe forming, and the pipe-making strain during steel pipe forming included in the learning data processed by the preprocessing section 62, or the actual information of previous steel pipe manufacturing characteristics normalized between 0 and 1.

The intermediate layer 102 includes a plurality of hidden layers, and a plurality of neurons are placed in each hidden layer. The number of the hidden layers included in the intermediate layer 102 is not limited but is preferably 5 or less because excess hidden layers empirically degrade the prediction accuracy.

The output layer 103 unites neuron information transmitted by the intermediate layer 102 and finally outputs the united information as the steel pipe collapse strength after steel pipe forming. On the basis of the output result and the read actual value of the previous collapse strength of the steel pipe after steel pipe forming, the weight coefficient in the neural network model is gradually optimized, and learning is performed.

The result storage section 64 allows the storage unit 9 to store learning data, a parameter (weight coefficient) of the neural network model, and the output result from the neural network model for the learning data.

The steel pipe manufacturing characteristics arithmetic section 7 in the arithmetic processing unit 5 inputs, into a steel pipe collapse strength prediction model generated in the steel pipe collapse strength prediction model generation section 6, steel pipe manufacturing characteristics including the steel pipe shape of a steel pipe the collapse strength of which is to be predicted, after steel pipe forming, steel pipe strength characteristics after steel pipe forming, and the pipe-making strain during steel pipe forming, to predict the steel pipe collapse strength after steel pipe forming corresponding to the steel pipe manufacturing characteristics. When steel pipe manufacturing characteristics determination mode information is the steel pipe manufacturing characteristics determination mode, the steel pipe manufacturing characteristics arithmetic section 7 sequentially changes at least one of the steel pipe shape after steel pipe forming, the steel pipe strength characteristics after steel pipe forming, and the pipe-making strain during steel pipe forming included in steel pipe manufacturing characteristics such that the predicted collapse strength of a steel pipe after steel pipe forming asymptotically approaches the requested collapse strength of an intended steel pipe after steel pipe forming, to determine the optimum steel pipe manufacturing characteristics.

For the determination processing, the steel pipe manufacturing characteristics arithmetic section 7 includes, as functional blocks, an information read section 71, a collapse strength prediction section 72, a steel pipe manufacturing characteristics determination section 73, and a result output section 74 as illustrated in FIG. 1.

The information read section 71 reads information that is stored in the storage unit 9 and is needed to achieve the function by the steel pipe manufacturing characteristics arithmetic section 7. Specifically, the information read section 71 reads a steel pipe collapse strength prediction model generated by the steel pipe collapse strength prediction model generation section 6. The information read section 71 further reads the information of steel pipe manufacturing characteristics including the steel pipe shape of a steel pipe the collapse strength of which is to be predicted, after steel pipe forming, steel pipe strength characteristics after steel pipe forming, and the pipe-making strain during steel pipe forming, which are to be input into a steel pipe collapse strength prediction model, the information of the collapse strength of an intended steel pipe after steel pipe forming, and steel pipe manufacturing characteristics determination mode information.

The collapse strength prediction section 72 inputs steel pipe manufacturing characteristics including the steel pipe shape of a steel pipe the collapse strength of which is to be predicted, after steel pipe forming, steel pipe strength characteristics after steel pipe forming, and the pipe-making strain during steel pipe forming, which have been read by the information read section 71, into a steel pipe collapse strength prediction model read by the information read section 71 to predict the steel pipe collapse strength after steel pipe forming.

When steel pipe manufacturing characteristics determination mode information read by the information read section 71 is the steel pipe manufacturing characteristics determination mode, the steel pipe manufacturing characteristics determination section 73 and the collapse strength prediction section 72 sequentially change at least one of the steel pipe shape after steel pipe forming, the steel pipe strength characteristics after steel pipe forming, and the pipe-making strain during steel pipe forming included in steel pipe manufacturing characteristics such that the predicted collapse strength of a steel pipe after steel pipe forming asymptotically approaches the requested collapse strength of an intended steel pipe after steel pipe forming, to determine the optimum steel pipe manufacturing characteristics, and outputs the information of the determined optimum steel pipe manufacturing characteristics to the result output section 74. When steel pipe manufacturing characteristics determination mode information read by the information read section 71 is not the steel pipe manufacturing characteristics determination mode, the steel pipe manufacturing characteristics determination section 73 outputs the information (predictive value) of the steel pipe collapse strength after steel pipe forming predicted by the collapse strength prediction section 72 to the result output section 74.

The result output section 74 outputs the information of the determined optimum steel pipe manufacturing characteristics or the information (predictive value) of the predicted collapse strength of a steel pipe after steel pipe forming to the output unit 10 and allows the storage unit 9 to store the information.

Figure 3:
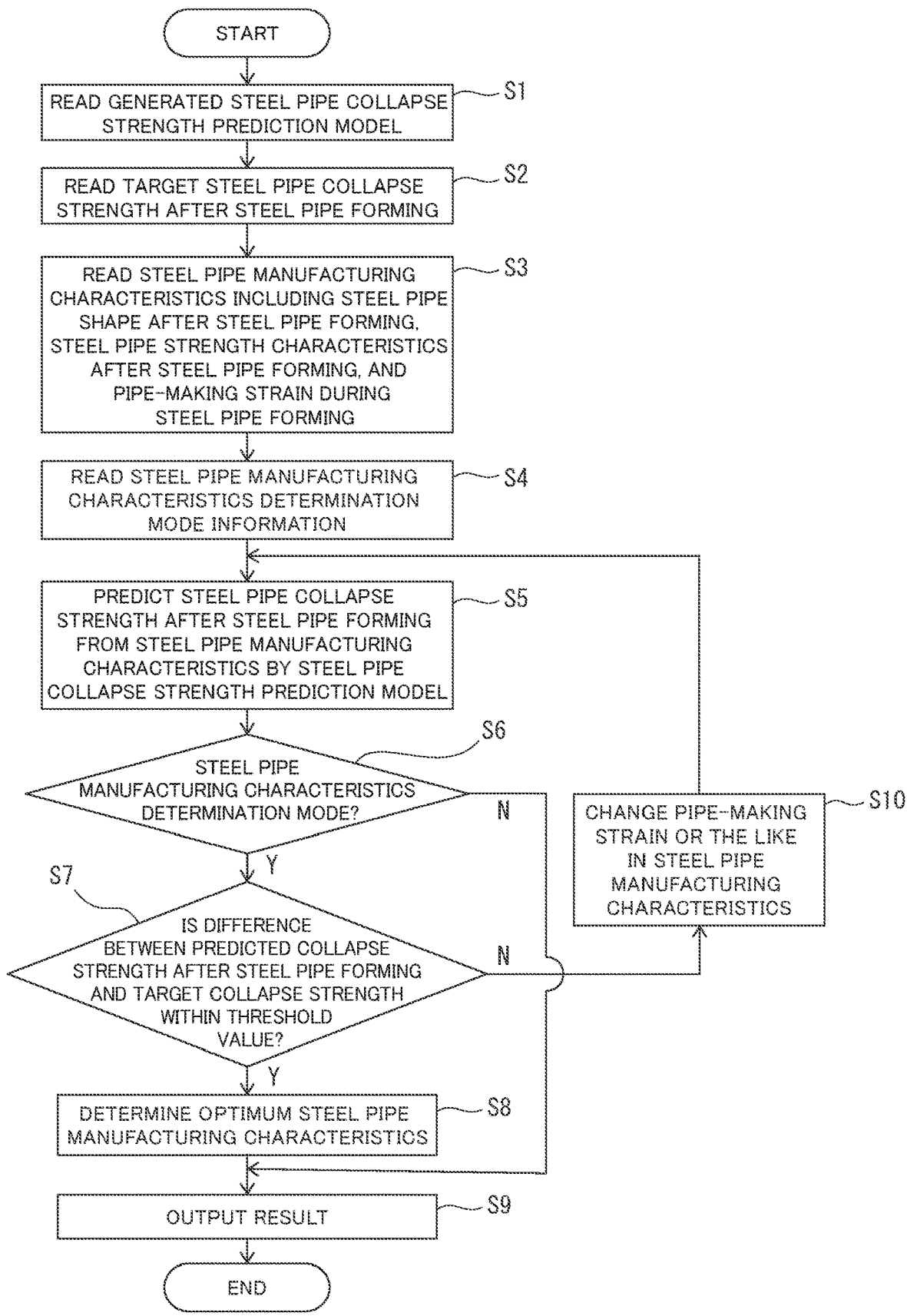
FIG. 3 is a flowchart for describing a processing flow of a steel pipe manufacturing characteristics arithmetic section in an arithmetic processing unit of the steel pipe manufacturing characteristics determination apparatus applied to the first embodiment of the present invention.

Next, the processing flow of the steel pipe manufacturing characteristics arithmetic section 7 of the arithmetic processing unit 5 in the steel pipe manufacturing characteristics determination apparatus 1 pertaining to the first embodiment of the present invention will be described with reference to FIG. 3.

On receiving a steel pipe manufacturing characteristics arithmetic command by inputting the steel pipe manufacturing characteristics arithmetic command into the input unit 8, the steel pipe manufacturing characteristics arithmetic section 7 executes the steel pipe manufacturing characteristics calculation program 42 stored in the ROM 4 and executes each function of the information read section 71, the collapse strength prediction section 72, the steel pipe manufacturing characteristics determination section 73, and the result output section 74.

First, the information read section 71 of the steel pipe manufacturing characteristics arithmetic section 7 reads, in step S1, a steel pipe collapse strength prediction model generated by the steel pipe collapse strength prediction model generation section 6 and stored in the storage unit 9.

Next, the information read section 71 reads, in step S2, the information of a requested collapse strength of an intended steel pipe after steel pipe forming input from a host computer (not illustrated) and stored in the storage unit 9.

Next, the information read section 71 reads, in step S3, the information of steel pipe manufacturing characteristics including the steel pipe shape of a steel pipe the collapse strength of which is to be predicted, after steel pipe forming, steel pipe strength characteristics after steel pipe forming, and the pipe-making strain during steel pipe forming, which have been input into the input unit 8 by an operator and are to be input into a steel pipe collapse strength prediction model stored in the storage unit 9.

Next, the information read section 71 reads, in step S4, steel pipe manufacturing characteristics determination mode information (information whether the mode is for determining the optimum steel pipe manufacturing characteristics) input into the input unit 8 by an operator and stored in the storage unit 9.

The collapse strength prediction section 72 then inputs, in step S5, the steel pipe manufacturing characteristics including the steel pipe shape of a steel pipe the collapse strength of which is to be predicted, after steel pipe forming, steel pipe strength characteristics after steel pipe forming, and the pipe-making strain during steel pipe forming read in step S3, into the steel pipe collapse strength prediction model read in step S1, to predict the steel pipe collapse strength after steel pipe forming.

Step S1 to step S5 correspond to the steel pipe collapse strength prediction method pertaining to the first embodiment of the present invention, in which steel pipe manufacturing characteristics including the steel pipe shape of a steel pipe to be predicted after steel pipe forming, steel pipe strength characteristics after steel pipe forming, and the pipe-making strain during steel pipe forming are input into a steel pipe collapse strength prediction model generated by the steel pipe collapse strength prediction model generation method to predict the steel pipe collapse strength after steel pipe forming.

Subsequently, the steel pipe manufacturing characteristics determination section 73 determines, in step S6, whether the steel pipe manufacturing characteristics determination mode information read in step S4 (information whether the mode is for determining the optimum steel pipe manufacturing characteristics) is the steel pipe manufacturing characteristics determination mode (mode for determining the optimum steel pipe manufacturing characteristics).

When the determination result in step S6 is YES (is the steel pipe manufacturing characteristics determination mode), the processing goes to step S7, and when the determination result in step S6 is NO (is not the steel pipe manufacturing characteristics determination mode), the processing goes to step S9.

In step S7, the steel pipe manufacturing characteristics determination section 73 determines whether the difference between the steel pipe collapse strength after steel pipe forming predicted in step S5 (predictive value) and the requested collapse strength of an intended steel pipe after steel pipe forming read in step S2 (target value) is within a predetermined threshold value.

In the embodiment, the above predetermined threshold value varies with target values or manufacturing conditions but is typically set at 0.5% to 1%.

When the determination result in step S7 is YES (when the difference between a predictive value and a target value is determined to be within a predetermined threshold value), the processing goes to step S8, and when the determination result in step S7 is NO (when the difference between a predictive value and a target value is determined to be larger than a predetermined threshold value), the processing goes to step S10.

In step S10, the steel pipe manufacturing characteristics determination section 73 changes at least one of the steel pipe shape after steel pipe forming, the steel pipe strength characteristics after steel pipe forming, and the pipe-making strain during steel pipe forming included in the steel pipe manufacturing characteristics of a steel pipe the collapse strength of which is to be predicted, which have been read in step S3, and the processing is returned to step S5.

When the processing is returned to step S5, the collapse strength prediction section 72 inputs steel pipe manufacturing characteristics of a steel pipe in which at least one of the steel pipe shape after steel pipe forming, the steel pipe strength characteristics after steel pipe forming, and the pipe-making strain during steel pipe forming has been changed in step S10, into the steel pipe collapse strength prediction model read in step S1 to re-predict the steel pipe collapse strength after steel pipe forming. Through step S6, the steel pipe manufacturing characteristics determination section 73 determines, in step S7, whether the difference between the steel pipe collapse strength after steel pipe forming re-predicted in step S5 (predictive value) and the requested collapse strength of an intended steel pipe after steel pipe forming read in step S2 (target value) is within a predetermined threshold value. A series of step S10, step S5, step S6, and step S7 is repeatedly executed until the determination result becomes YES.

When the determination result in step S7 is YES (when the difference between a predictive value and a target value is determined to be within a predetermined threshold value), the processing goes to step S8. In step S8, the steel pipe manufacturing characteristics determination section 73 determines the steel pipe manufacturing characteristics including the steel pipe shape of a steel pipe after steel pipe forming, steel pipe strength characteristics after steel pipe forming, and the pipe-making strain during steel pipe forming when the difference between a predictive value and a target value is determined to be within a predetermined threshold value, to be the optimum steel pipe manufacturing characteristics.

Step S6, step S7, step S10, step S5, step S6, step S7, and step S8 correspond to the steel pipe manufacturing characteristics determination method pertaining to the first embodiment of the present invention, in which at least one of the steel pipe shape after steel pipe forming, the steel pipe strength characteristics after steel pipe forming, and the pipe-making strain during steel pipe forming included in steel pipe manufacturing characteristics is sequentially changed such that the predicted collapse strength of a steel pipe after steel pipe forming asymptotically approaches the requested collapse strength of an intended steel pipe after steel pipe forming, to determine the optimum steel pipe manufacturing characteristics.

When the determination result in step S6 is YES (is a steel pipe manufacturing characteristics determination mode), in step S9, the result output section 74 of the steel pipe manufacturing characteristics arithmetic section 7 outputs the information of the optimum steel pipe manufacturing characteristics determined in step S8 to the output unit 10. When the determination result in step S6 is NO (is not the steel pipe manufacturing characteristics determination mode), the result output section 74 outputs the information (predictive value) of the steel pipe collapse strength after steel pipe forming predicted in step S5 to the output unit 10.

The processing of the steel pipe manufacturing characteristics arithmetic section 7 is thus completed.

As described above, the steel pipe collapse strength prediction model generation method pertaining to the first embodiment of the present invention performs machine learning of a plurality of learning data that include, as input data, previous steel pipe manufacturing characteristics including the steel pipe shape after steel pipe forming, steel pipe strength characteristics after steel pipe forming, and the pipe-making strain during steel pipe forming and, as an output datum for the input data, the previous collapse strength of the steel pipe after steel pipe forming, to generate a steel pipe collapse strength prediction model that predicts the steel pipe collapse strength after steel pipe forming (steel pipe collapse strength prediction model generation section 6).

This enables appropriate generation of a steel pipe collapse strength prediction model for highly accurately predicting the steel pipe collapse strength after steel pipe forming in consideration of the pipe-making strain during steel pipe forming.

In the steel pipe collapse strength prediction method pertaining to the first embodiment of the present invention, steel pipe manufacturing characteristics including the steel pipe shape of a steel pipe to be predicted after steel pipe forming, steel pipe strength characteristics after steel pipe forming, and the pipe-making strain during steel pipe forming are input into a steel pipe collapse strength prediction model generated by the steel pipe collapse strength prediction model generation method, to predict the steel pipe collapse strength after steel pipe forming (step S1 to step S5).

This enables accurate prediction of the steel pipe collapse strength after steel pipe forming in consideration of the pipe-making strain during steel pipe forming.

In the steel pipe manufacturing characteristics determination method pertaining to the first embodiment of the present invention, at least one of the steel pipe shape after steel pipe forming, the steel pipe strength characteristics after steel pipe forming, and the pipe-making strain during steel pipe forming included in steel pipe manufacturing characteristics is sequentially changed such that the predicted collapse strength of a steel pipe after steel pipe forming asymptotically approaches the requested collapse strength of an intended steel pipe after steel pipe forming, to determine the optimum steel pipe manufacturing characteristics (step S6, step S7, step S10, step S5, step S6, step S7, and step S8).

This enables determination of the optimum steel pipe manufacturing characteristics including the steel pipe shape after steel pipe forming, steel pipe strength characteristics after steel pipe forming, and the pipe-making strain during steel pipe forming when the predicted collapse strength of a steel pipe after steel pipe forming asymptotically approaches the requested collapse strength of an intended steel pipe after steel pipe forming.

To manufacture a steel pipe, the information (predictive value) of the steel pipe collapse strength after steel pipe forming predicted in step S5 and output from the output unit 10 can be assigned to a steel pipe formed in a forming step.

In other words, the steel pipe manufacturing method pertaining to the first embodiment of the present invention may include a steel pipe forming step of forming a steel pipe, a collapse strength prediction step of predicting the collapse strength of the steel pipe formed in the forming step, by the steel pipe collapse strength prediction method (step S1 to step S5), and a performance predictive value assignment step of assigning the steel pipe collapse strength predicted in the collapse strength prediction step to the steel pipe formed in the forming step.

In the embodiment, the assigning the predicted steel pipe collapse strength to the formed steel pipe in the performance predictive value assignment step is achieved, for example, by marking the formed steel pipe with the predicted steel pipe collapse strength (predictive value) or by attaching a label with the predicted steel pipe collapse strength (predictive value) to the formed steel pipe.

This allows a person handling a formed steel pipe to identify the collapse strength (predictive value) of the steel pipe.

To manufacture a steel pipe, steel pipe manufacturing conditions (selection of the pipe-making method, the flexural modulus at the time of pipe-making, the strain applied at the time of pipe-making, and the like) may be determined on the basis of the information of the optimum steel pipe manufacturing characteristics determined in step S8 and output from the output unit 10, and a steel pipe may be manufactured under the determined steel pipe manufacturing conditions.

In other words, in the steel pipe manufacturing method pertaining to the first embodiment of the present invention, steel pipe manufacturing conditions may be determined on the basis of the optimum steel pipe manufacturing characteristics determined by the steel pipe manufacturing characteristics determination method (step S6, step S7, step S10, step S5, step S6, step S7, and step S8), and a steel pipe may be manufactured under the determined steel pipe manufacturing conditions.

The manufactured steel pipe therefore satisfies the determined optimum steel pipe manufacturing characteristics. As a result, the predicted steel pipe collapse strength (predictive value) asymptotically approaches the requested collapse strength of an intended steel pipe after steel pipe forming, and the manufactured steel pipe has excellent anti-collapse performance and can prevent structure damage or destruction.

Second Embodiment

A steel pipe collapse strength prediction model generation method, a steel pipe collapse strength prediction method, a steel pipe manufacturing characteristics determination method, and a steel pipe manufacturing method pertaining to a second embodiment of the present invention will be described with reference to FIG. 1, FIG. 4, and FIG. 5. The components that have been described in the first embodiment may not be described.

The steel pipe manufacturing characteristics determination apparatus 1 illustrated in FIG. 1 is also applied to the steel pipe collapse strength prediction model generation method, the steel pipe collapse strength prediction method, and the steel pipe manufacturing characteristics determination method pertaining to the second embodiment. The steel pipe collapse strength prediction model generation method pertaining to the second embodiment generates a steel pipe collapse strength prediction model for a coated steel pipe coated after steel pipe forming. The steel pipe collapse strength prediction method pertaining to the second embodiment uses the generated steel pipe collapse strength prediction model to predict the collapse strength of a coated steel pipe coated after steel pipe forming. The steel pipe manufacturing characteristics determination method pertaining to the second embodiment determines the optimum steel pipe manufacturing characteristics such that the predicted collapse strength of a coated steel pipe asymptotically approaches the requested collapse strength of an intended coated steel pipe.

The steel pipe manufacturing characteristics determination apparatus 1 illustrated in FIG. 1 and pertaining to the second embodiment is a computer system including an arithmetic unit 2, an input unit 8, a storage unit 9, and an output unit 10. The basic configuration of the apparatus has been described above and thus is not described as appropriate.

Into the input unit 8, a steel pipe collapse strength prediction model generation command, a steel pipe manufacturing characteristics arithmetic command, and the like are input as with the first embodiment. In the second embodiment unlike the first embodiment, the collapse strength of a coated steel pipe coated after steel pipe forming is predicted, and thus as the steel pipe manufacturing characteristics, coating conditions are input in addition to the steel pipe shape of a coated steel pipe the collapse strength of which is to be predicted, after steel pipe forming, steel pipe strength characteristics after steel pipe forming, and the pipe-making strain during steel pipe forming. Into the input unit 8, the collapse strength of an intended coated steel pipe coated after steel pipe forming and the like are input.

In the embodiment, the steel pipe shape after steel pipe forming, the steel pipe strength characteristics after steel pipe forming, and the pipe-making strain during steel pipe forming are the same as in the first embodiment, and the coating conditions are the maximum temperature (° C.) and the holding time (min) during coating. As the coating conditions, actually measured values are input.

Coating a formed steel pipe is for anticorrosion. In particular, steel pipes used in a submarine pipeline require excellent corrosion resistance and thus are typically coated after forming. The coating conditions (maximum temperature (° C.) and holding time (min)) during coating affect the steel pipe strength characteristics after steel pipe forming and directly affect the anti-collapse performance of a coated steel pipe. The coating conditions are thus input into the input unit 8. The effect of coating heat changes the quality of the material of a steel pipe (dislocation deposition, recovery, strain aging, and the like), and this increases or decreases the collapse strength of a steel pipe after steel pipe forming (anti-collapse performance before coating).

The storage unit 9 is a unit that stores information needed to achieve the functions by the steel pipe collapse strength prediction model generation section 6 and the steel pipe manufacturing characteristics arithmetic section 7. Examples of the information needed to achieve the function by the steel pipe collapse strength prediction model generation section 6 include a plurality of learning data that include, as input data, previous steel pipe manufacturing characteristics including the steel pipe shape after steel pipe forming, steel pipe strength characteristics after steel pipe forming, the pipe-making strain during steel pipe forming, and coating conditions and, as an output datum for the input data, the previous collapse strength of the coated steel pipe coated after steel pipe forming.

Examples of the information needed to achieve the function by the steel pipe manufacturing characteristics arithmetic section 7 include a steel pipe collapse strength prediction model generated by the steel pipe collapse strength prediction model generation section 6, steel pipe manufacturing characteristics that include the steel pipe shape of a coated steel pipe the collapse strength of which is to be predicted, after steel pipe forming, steel pipe strength characteristics after steel pipe forming, the pipe-making strain during steel pipe forming, and coating conditions, are input into the input unit 8, and are to be input into a steel pipe collapse strength prediction model, the collapse strength of an intended coated steel pipe coated after steel pipe forming, and steel pipe manufacturing characteristics determination mode information (information whether a mode is for determining the optimum steel pipe manufacturing characteristics).

The output unit 10 functions as an output port to output output data from the arithmetic unit 2, such as information of the collapse strength (predictive value) of a coated steel pipe coated after steel pipe forming predicted by the collapse strength prediction section 72 and information of the optimum steel pipe manufacturing characteristics determined by the steel pipe manufacturing characteristics determination section 73.

Next, the arithmetic unit 2 has substantially the same configuration as in the first embodiment and particularly includes, as functional blocks, a steel pipe collapse strength prediction model generation section 6 and a steel pipe manufacturing characteristics arithmetic section 7.

The steel pipe collapse strength prediction model generation section 6 of the arithmetic processing unit 5 performs machine learning of a plurality of learning data that are stored in the storage unit 9 and include, as input data, previous steel pipe manufacturing characteristics including the steel pipe shape after steel pipe forming, steel pipe strength characteristics after steel pipe forming, the pipe-making strain during steel pipe forming, and coating conditions and, as an output datum for the input data, the previous collapse strength of the coated steel pipe coated after steel pipe forming, to generate a steel pipe collapse strength prediction model. The machine learning method is a neural network as with the first embodiment, and the steel pipe collapse strength prediction model is a prediction model constructed by the neural network.

In the embodiment, the steel pipe collapse strength prediction model generation section 6 includes, as functional blocks, a learning data acquisition section 61, a preprocessing section 62, a model generation section 63, and a result storage section 64 as with the first embodiment. On receiving a steel pipe collapse strength prediction model generation command by inputting the steel pipe collapse strength prediction model generation command into the input unit 8, the steel pipe collapse strength prediction model generation section 6 executes the steel pipe collapse strength prediction model generation program 41 stored in the ROM 4 and executes each function of the learning data acquisition section 61, the preprocessing section 62, the model generation section 63, and the result storage section 64. After every execution of the functions by the steel pipe collapse strength prediction model generation section 6, the steel pipe collapse strength prediction model is updated.

The execution of each function of the learning data acquisition section 61, the preprocessing section 62, the model generation section 63, and the result storage section 64 by the steel pipe collapse strength prediction model generation section 6 corresponds to the steel pipe collapse strength prediction model generation method that pertains to the second embodiment of the present invention and performs machine learning of a plurality of learning data that include, as input data, previous steel pipe manufacturing characteristics including the steel pipe shape after steel pipe forming, steel pipe strength characteristics after steel pipe forming, the pipe-making strain during steel pipe forming, and coating conditions and, as an output datum for the input data, the previous collapse strength of the coated steel pipe coated after steel pipe forming, to generate a steel pipe collapse strength prediction model that predicts the collapse strength of a coated steel pipe coated after steel pipe forming.

In the embodiment, the learning data acquisition section 61 acquires a plurality of learning data that are stored in the storage unit 9 and include, as input data, previous steel pipe manufacturing characteristics including the steel pipe shape after steel pipe forming, steel pipe strength characteristics after steel pipe forming, the pipe-making strain during steel pipe forming, and coating conditions and, as an output datum for the input data, the previous collapse strength of the coated steel pipe coated after steel pipe forming. Each learning datum is a set of input data and an output datum.

The preprocessing section 62 processes the plurality of learning data acquired by the learning data acquisition section 61 into data for generating a steel pipe collapse strength prediction model as with the first embodiment.

The model generation section 63 generates a steel pipe collapse strength prediction model that performs machine learning of the plurality of learning data that have been preprocessed by the preprocessing section 62 and include, as input data, previous steel pipe manufacturing characteristics including the steel pipe shape after steel pipe forming, steel pipe strength characteristics after steel pipe forming, the pipe-making strain during steel pipe forming, and coating conditions and, as an output datum, the previous collapse strength of the coated steel pipe coated after steel pipe forming. In the present embodiment, a neural network is adopted as the machine learning method as with the first embodiment, and thus a neural network model is generated as the steel pipe collapse strength prediction model.

Figure 4:
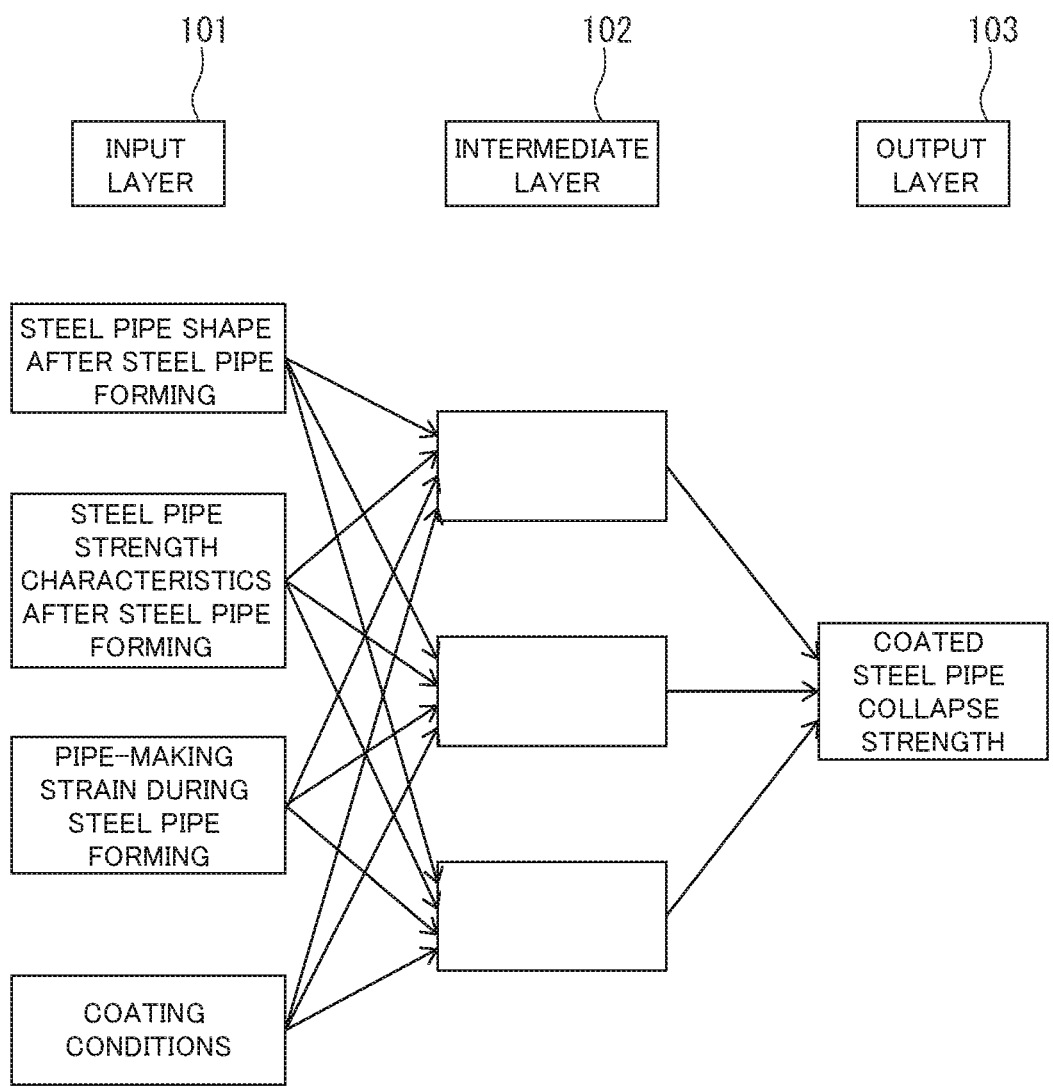
FIG. 4 is a view illustrating a processing flow of a steel pipe collapse strength prediction model constructed by a neural network generated by the steel pipe collapse strength prediction model generation method pertaining to the second embodiment of the present invention.
Figure 5:
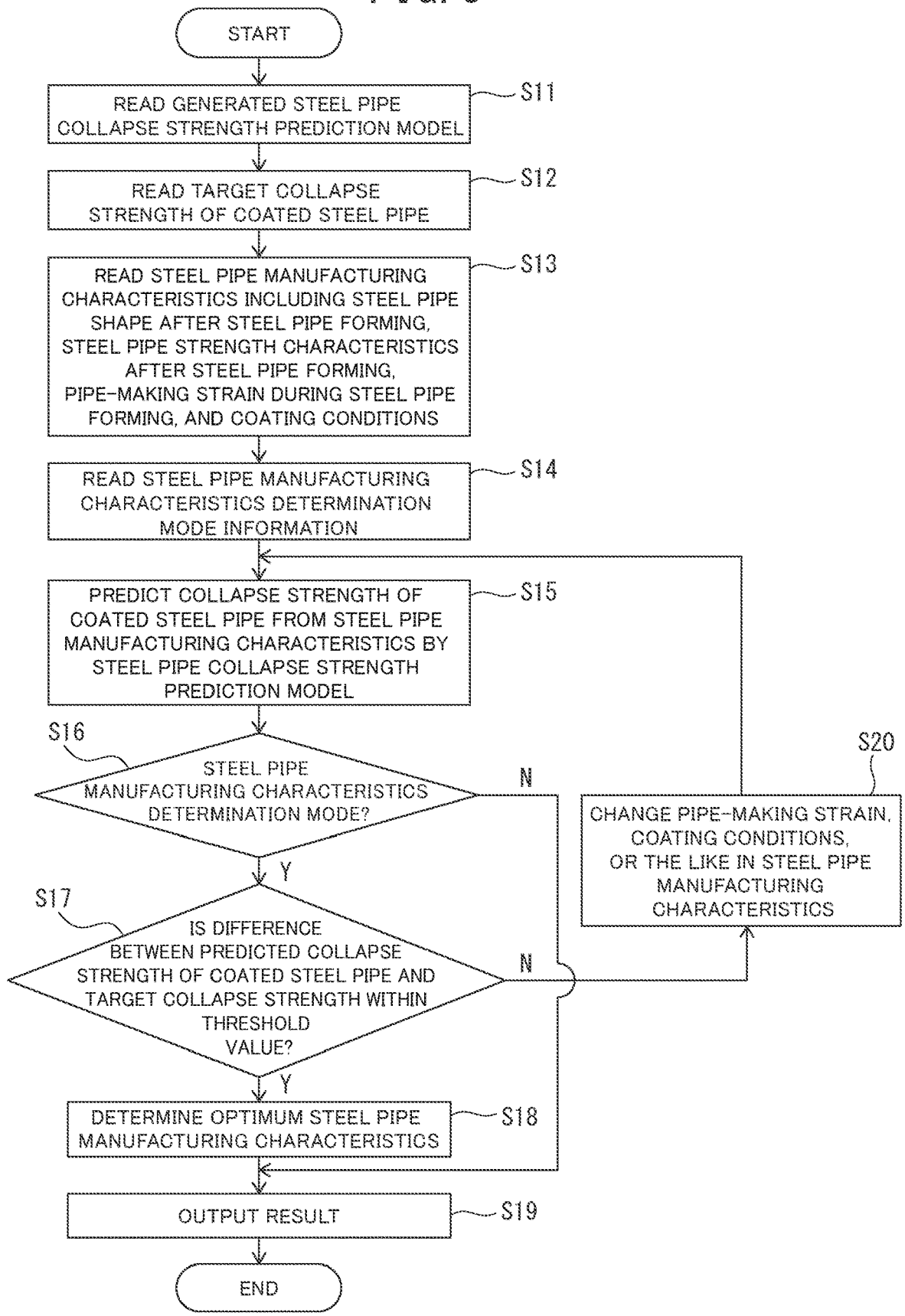
FIG. 5 is a flowchart for describing a processing flow of a steel pipe manufacturing characteristics arithmetic section in an arithmetic processing unit of a steel pipe manufacturing characteristics determination apparatus to which the steel pipe collapse strength prediction model generation method, the steel pipe collapse strength prediction method, and the steel pipe manufacturing characteristics determination method pertaining to the second embodiment of the present invention are applied.

FIG. 4 illustrates a processing flow of a steel pipe collapse strength prediction model as a neural network model generated by the steel pipe collapse strength prediction model generation method pertaining to the second embodiment of the present invention.

The steel pipe collapse strength prediction model as a neural network model includes an input layer 101, an intermediate layer 102, and an output layer 103 sequentially from the input side.

When the model generation section 63 performs learning by a neural network model using hyperparameters, the input layer 101 stores the actual information of previous steel pipe manufacturing characteristics including the steel pipe shape after steel pipe forming, steel pipe strength characteristics after steel pipe forming, the pipe-making strain during steel pipe forming, and coating conditions included in the learning data processed by the preprocessing section 62, or the actual information of previous steel pipe manufacturing characteristics normalized between 0 and 1.

The intermediate layer 102 includes a plurality of hidden layers, and a plurality of neurons are placed in each hidden layer.

The output layer 103 unites neuron information transmitted by the intermediate layer 102 and finally outputs the united information as the collapse strength of a coated steel pipe coated after steel pipe forming. On the basis of the output result and the read actual value of the previous collapse strength of a coated steel pipe, the weight coefficient in the neural network model is gradually optimized, and learning is performed.

The result storage section 64 allows the storage unit 9 to store learning data, a parameter (weight coefficient) of the neural network model, and the output result from the neural network model for the learning data.

The steel pipe manufacturing characteristics arithmetic section 7 in the arithmetic processing unit 5 inputs, into a steel pipe collapse strength prediction model generated in the steel pipe collapse strength prediction model generation section 6, steel pipe manufacturing characteristics including the steel pipe shape of a coated steel pipe the collapse strength of which is to be predicted, after steel pipe forming, steel pipe strength characteristics after steel pipe forming, the pipe-making strain during steel pipe forming, and coating conditions, to predict the collapse strength of the coated steel pipe coated after steel pipe forming corresponding to the steel pipe manufacturing characteristics. When steel pipe manufacturing characteristics determination mode information is the steel pipe manufacturing characteristics determination mode, the steel pipe manufacturing characteristics arithmetic section 7 sequentially changes at least one of the steel pipe shape after steel pipe forming, the steel pipe strength characteristics after steel pipe forming, the pipe-making strain during steel pipe forming, and the coating conditions included in steel pipe manufacturing characteristics such that the predicted collapse strength of a coated steel pipe asymptotically approaches the requested collapse strength of an intended coated steel pipe, to determine the optimum steel pipe manufacturing characteristics.

For the determination processing, the steel pipe manufacturing characteristics arithmetic section 7 includes, as functional blocks, an information read section 71, a collapse strength prediction section 72, a steel pipe manufacturing characteristics determination section 73, and a result output section 74 as illustrated in FIG. 1.

The information read section 71 reads a steel pipe collapse strength prediction model generated by the steel pipe collapse strength prediction model generation section 6. The information read section 71 further reads the information of steel pipe manufacturing characteristics including the steel pipe shape of a steel pipe the collapse strength of which is to be predicted, after steel pipe forming, steel pipe strength characteristics after steel pipe forming, the pipe-making strain during steel pipe forming, and coating conditions, which are to be input into a steel pipe collapse strength prediction model, the information of the collapse strength of an intended coated steel pipe, and steel pipe manufacturing characteristics determination mode information.

The collapse strength prediction section 72 inputs steel pipe manufacturing characteristics including the steel pipe shape of a steel pipe the collapse strength of which is to be predicted, after steel pipe forming, steel pipe strength characteristics after steel pipe forming, the pipe-making strain during steel pipe forming, and coating conditions, which have been read by the information read section 71, into a steel pipe collapse strength prediction model read by the information read section 71 to predict the collapse strength of a coated steel pipe coated after steel pipe forming.

When steel pipe manufacturing characteristics determination mode information read by the information read section 71 is the steel pipe manufacturing characteristics determination mode, the steel pipe manufacturing characteristics determination section 73 and the collapse strength prediction section 72 sequentially change at least one of the steel pipe shape after steel pipe forming, the steel pipe strength characteristics after steel pipe forming, the pipe-making strain during steel pipe forming, and the coating conditions included in steel pipe manufacturing characteristics such that the predicted collapse strength of a coated steel pipe asymptotically approaches the requested collapse strength of an intended coated steel pipe, to determine the optimum steel pipe manufacturing characteristics, and outputs the information of the determined optimum steel pipe manufacturing characteristics to the result output section 74. When steel pipe manufacturing characteristics determination mode information read by the information read section 71 is not the steel pipe manufacturing characteristics determination mode, the steel pipe manufacturing characteristics determination section 73 outputs the information (predictive value) of the collapse strength of a coated steel pipe predicted by the collapse strength prediction section 72 to the result output section 74.

The result output section 74 outputs the information of the determined optimum steel pipe manufacturing characteristics or the information (predictive value) of the predicted collapse strength of a coated steel pipe to the output unit 10 and allows the storage unit 9 to store the information.

Next, the processing flow of the steel pipe manufacturing characteristics arithmetic section 7 of the arithmetic processing unit 5 in the steel pipe manufacturing characteristics determination apparatus 1 pertaining to the second embodiment of the present invention will be described with reference to FIG. 5.

On receiving a steel pipe manufacturing characteristics arithmetic command by inputting the steel pipe manufacturing characteristics arithmetic command into the input unit 8, the steel pipe manufacturing characteristics arithmetic section 7 executes the steel pipe manufacturing characteristics calculation program 42 stored in the ROM 4 and executes each function of the information read section 71, the collapse strength prediction section 72, the steel pipe manufacturing characteristics determination section 73, and the result output section 74.

First, the information read section 71 of the steel pipe manufacturing characteristics arithmetic section 7 reads, in step S11, a steel pipe collapse strength prediction model generated by the steel pipe collapse strength prediction model generation section 6 and stored in the storage unit 9.

Next, the information read section 71 reads, in step S12, the information of a requested collapse strength of an intended coated steel pipe coated after steel pipe forming input from a host computer (not illustrated) and stored in the storage unit 9.

Next, the information read section 71 reads, in step S13, the information of steel pipe manufacturing characteristics including the steel pipe shape of a coated steel pipe the collapse strength of which is to be predicted, after steel pipe forming, steel pipe strength characteristics after steel pipe forming, the pipe-making strain during steel pipe forming, and coating conditions, which have been input into the input unit 8 by an operator and are to be input into a steel pipe collapse strength prediction model stored in the storage unit 9.

Next, the information read section 71 reads, in step S14, steel pipe manufacturing characteristics determination mode information (information whether the mode is for determining the optimum steel pipe manufacturing characteristics) input into the input unit 8 by an operator and stored in the storage unit 9.

The collapse strength prediction section 72 then inputs, in step S15, the steel pipe manufacturing characteristics including the steel pipe shape of a coated steel pipe the collapse strength of which is to be predicted, after steel pipe forming, steel pipe strength characteristics after steel pipe forming, the pipe-making strain during steel pipe forming, and coating conditions read in step S13, into the steel pipe collapse strength prediction model read in step S11, to predict the collapse strength of a coated steel pipe.

Step S11 to step S15 correspond to the steel pipe collapse strength prediction method pertaining to the second embodiment of the present invention, in which steel pipe manufacturing characteristics including the steel pipe shape of a coated steel pipe to be predicted, after steel pipe forming, steel pipe strength characteristics after steel pipe forming, the pipe-making strain during steel pipe forming, and coating conditions are input into a steel pipe collapse strength prediction model generated by the steel pipe collapse strength prediction model generation method to predict the collapse strength of the coated steel pipe.

Subsequently, the steel pipe manufacturing characteristics determination section 73 determines, in step S16, whether the steel pipe manufacturing characteristics determination mode information read in step S14 (information whether the mode is for determining the optimum steel pipe manufacturing characteristics) is the steel pipe manufacturing characteristics determination mode (mode for determining the optimum steel pipe manufacturing characteristics).

When the determination result in step S16 is YES (is the steel pipe manufacturing characteristics determination mode), the processing goes to step S17, and when the determination result in step S16 is NO (is not the steel pipe manufacturing characteristics determination mode), the processing goes to step S19.

In step S17, the steel pipe manufacturing characteristics determination section 73 determines whether the difference between the collapse strength of a coated steel pipe predicted in step S15 (predictive value) and the requested collapse strength of an intended coated steel pipe read in step S12 (target value) is within a predetermined threshold value.

In the above embodiment, the above predetermined threshold value is typically set at 0.5% to 1%.

When the determination result in step S17 is YES (when the difference between a predictive value and a target value is determined to be within a predetermined threshold value), the processing goes to step S18, and when the determination result in step S17 is NO (when the difference between a predictive value and a target value is determined to be larger than a predetermined threshold value), the processing goes to step S20.

In step S20, the steel pipe manufacturing characteristics determination section 73 changes at least one of the steel pipe shape after steel pipe forming, the steel pipe strength characteristics after steel pipe forming, the pipe-making strain during steel pipe forming, and the coating conditions included in steel pipe manufacturing characteristics of a coated steel pipe the collapse strength of which is to be predicted, which have been read in step S13, and the processing is returned to step S15.

When the processing is returned to step S15, the collapse strength prediction section 72 inputs steel pipe manufacturing characteristics of a steel pipe in which at least one of the steel pipe shape after steel pipe forming, the steel pipe strength characteristics after steel pipe forming, the pipe-making strain during steel pipe forming, and the coating conditions has been changed in step S20, into the steel pipe collapse strength prediction model read in step S11 to re-predict the collapse strength of a coated steel pipe. Through step S16, the steel pipe manufacturing characteristics determination section 73 determines, in step S17, whether the difference between the collapse strength of a coated steel pipe re-predicted in step S15 (predictive value) and the requested collapse strength of an intended coated steel pipe read in step S12 (target value) is within a predetermined threshold value. A series of step S20, step S15, step S16, and step S17 is repeatedly executed until the determination result becomes YES.

When the determination result in step S17 is YES (when the difference between a predictive value and a target value is determined to be within a predetermined threshold value), the processing goes to step S18. In step S18, the steel pipe manufacturing characteristics determination section 73 determines the steel pipe manufacturing characteristics including the steel pipe shape after steel pipe forming, steel pipe strength characteristics after steel pipe forming, the pipe-making strain during steel pipe forming, and the coating conditions when the difference between a predictive value and a target value is determined to be within a predetermined threshold value, to be the optimum steel pipe manufacturing characteristics.

Step S16, step S17, step S20, step S15, step S16, step S17, and step S18 correspond to the steel pipe manufacturing characteristics determination method pertaining to the second embodiment of the present invention, in which at least one of the steel pipe shape after steel pipe forming, the steel pipe strength characteristics after steel pipe forming, the pipe-making strain during steel pipe forming, and the coating conditions included in steel pipe manufacturing characteristics is sequentially changed such that the predicted collapse strength of a coated steel pipe coated after steel pipe forming asymptotically approaches the requested collapse strength of an intended coated steel pipe, to determine the optimum steel pipe manufacturing characteristics.

When the determination result in step S16 is YES (is a steel pipe manufacturing characteristics determination mode), in step S19, the result output section 74 of the steel pipe manufacturing characteristics arithmetic section 7 outputs the information of the optimum steel pipe manufacturing characteristics determined in step S18 to the output unit 10. When the determination result in step S16 is NO (is not the steel pipe manufacturing characteristics determination mode), the result output section 74 outputs the information (predictive value) of the collapse strength of a coated steel pipe coated after steel pipe forming predicted in step S15 to the output unit 10.

The processing of the steel pipe manufacturing characteristics arithmetic section 7 is thus completed.

As described above, the steel pipe collapse strength prediction model generation method pertaining to the second embodiment of the present invention performs machine learning of a plurality of learning data that include, as input data, previous steel pipe manufacturing characteristics including the steel pipe shape after steel pipe forming, steel pipe strength characteristics after steel pipe forming, the pipe-making strain during steel pipe forming, and coating conditions and, as an output datum for the input data, the previous collapse strength of the steel pipe after steel pipe forming, to generate a steel pipe collapse strength prediction model that predicts the steel pipe collapse strength after steel pipe forming (steel pipe collapse strength prediction model generation section 6).

This enables appropriate generation of a steel pipe collapse strength prediction model for highly accurately predicting the collapse strength of a coated steel pipe coated after steel pipe forming in consideration of the pipe-making strain during steel pipe forming.

Coating conditions that greatly affect the collapse strength of a coated steel pipe are also considered to generate a steel pipe collapse strength prediction model that predicts the collapse strength of a coated steel pipe, and thus the steel pipe collapse strength prediction model can have higher accuracy.

In the steel pipe collapse strength prediction method pertaining to the second embodiment of the present invention, steel pipe manufacturing characteristics including the steel pipe shape of a coated steel pipe to be predicted, after steel pipe forming, steel pipe strength characteristics after steel pipe forming, the pipe-making strain during steel pipe forming, and coating conditions are input into a steel pipe collapse strength prediction model generated by the steel pipe collapse strength prediction model generation method, to predict the steel pipe collapse strength after steel pipe forming (step S11 to step S15).

This enables accurate prediction of the collapse strength of a coated steel pipe coated after steel pipe forming in consideration of the pipe-making strain during steel pipe forming.

Coating conditions that greatly affect the collapse strength of a coated steel pipe are also considered to predict the collapse strength of a coated steel pipe, and thus the collapse strength of a coated steel pipe can be predicted at higher accuracy.

In the steel pipe manufacturing characteristics determination method pertaining to the second embodiment of the present invention, at least one of the steel pipe shape after steel pipe forming, the steel pipe strength characteristics after steel pipe forming, the pipe-making strain during steel pipe forming, and the coating conditions included in steel pipe manufacturing characteristics is sequentially changed such that the predicted collapse strength of a coated steel pipe asymptotically approaches the requested collapse strength of an intended coated steel pipe, to determine the optimum steel pipe manufacturing characteristics (step S16, step S17, step S20, step S15, step S16, step S17, and step S18).

This enables determination of the optimum steel pipe manufacturing characteristics including the steel pipe shape after steel pipe forming, steel pipe strength characteristics after steel pipe forming, the pipe-making strain during steel pipe forming, and coating conditions when the predicted collapse strength of a coated steel pipe asymptotically approaches the requested collapse strength of an intended coated steel pipe.

To manufacture a coated steel pipe, the information (predictive value) of the collapse strength of a coated steel pipe predicted in step S15 and output from the output unit 10 can be assigned to the coated steel pipe formed in the forming step.

In other words, the steel pipe manufacturing method pertaining to the second embodiment of the present invention may include a coated steel pipe forming step of forming a steel pipe and coating the formed steel pipe to form a coated steel pipe, a collapse strength prediction step of predicting the collapse strength of the coated steel pipe formed in the coated steel pipe forming step, by the steel pipe collapse strength prediction method (step S11 to step S15), and a performance predictive value assignment step of assigning the collapse strength of the coated steel pipe predicted in the collapse strength prediction step to the coated steel pipe formed in the coated steel pipe forming step.

In the embodiment, the assigning the predicted coated steel pipe collapse strength to the coated steel pipe in the performance predictive value assignment step is achieved, for example, by marking the coated steel pipe with the predicted coated steel pipe collapse strength (predictive value) or by attaching a label with the predicted coated steel pipe collapse strength (predictive value) to the coated steel pipe.

This allows a person handling a coated steel pipe to identify the collapse strength (predictive value) of the coated steel pipe.

To manufacture a coated steel pipe, coated steel pipe manufacturing conditions (selection of the pipe-making method, the flexural modulus at the time of pipe-making, the strain at the time of pipe-making, the temperature increase rate during coating, the maximum temperature during coating, the maximum temperature holding time during coating, the cooling rate during coating after the maximum temperature holding time, and the like) may be determined on the basis of the information of the optimum steel pipe manufacturing characteristics determined in step S18 and output from the output unit 10, and a coated steel pipe may be manufactured under the determined coated steel pipe manufacturing conditions.

In other words, in the steel pipe manufacturing method pertaining to the second embodiment of the present invention, coated steel pipe manufacturing conditions may be determined on the basis of the optimum steel pipe manufacturing characteristics determined by the coated steel pipe manufacturing characteristics determination method (step S16, step S17, step S20, step S15, step S16, step S17, and step S18), and a coated steel pipe may be manufactured under the determined coated steel pipe manufacturing conditions.

The manufactured coated steel pipe satisfies the determined optimum steel pipe manufacturing characteristics. As a result, the predicted coated steel pipe collapse strength (predictive value) asymptotically approaches the requested collapse strength of an intended coated steel pipe, and the manufactured coated steel pipe has excellent anti-collapse performance and can prevent structure damage or destruction.

The embodiments of the present invention have been described, but the present invention is not limited to them, and various modifications and improvements can be made.

For example, when a steel pipe collapse strength prediction model is generated in the steel pipe collapse strength prediction model generation method pertaining to the first embodiment, the previous steel pipe manufacturing characteristics as the input data are the steel pipe shape after steel pipe forming, steel pipe strength characteristics after steel pipe forming, and the pipe-making strain during steel pipe forming. The previous steel pipe manufacturing characteristics, however, at least include the previous steel pipe shape after steel pipe forming, steel pipe strength characteristics after steel pipe forming, and the pipe-making strain during steel pipe forming, and may further include other previous steel pipe manufacturing characteristics such as previous strength characteristics of a steel sheet before steel pipe forming.

Similarly, when a steel pipe collapse strength prediction model is generated in the steel pipe collapse strength prediction model generation method pertaining to the second embodiment, the previous steel pipe manufacturing characteristics as the input data at least include the previous steel pipe shape after steel pipe forming, steel pipe strength characteristics after steel pipe forming, the pipe-making strain during steel pipe forming, and coating conditions, and may further include other previous steel pipe manufacturing characteristics such as previous strength characteristics of a steel sheet before steel pipe forming.

When a steel pipe collapse strength prediction model is generated in the steel pipe collapse strength prediction model generation method pertaining to the first embodiment or the second embodiment, the previous steel pipe shape after steel pipe forming as the input datum is not limited to the maximum outer diameter Dmax (mm) of a steel pipe, the minimum outer diameter Dmin (mm) of a steel pipe, the average outer diameter Dave (mm) of a steel pipe, the average thickness t (mm) of a steel pipe, and the roundness (ovality) fO (%) of the outer circumferential shape of a steel pipe.

When a steel pipe collapse strength prediction model is generated in the steel pipe collapse strength prediction model generation method pertaining to the first embodiment or the second embodiment, the steel pipe strength characteristics after steel pipe forming as the input data are not limited to the Young's modulus E (GPa) of a steel pipe, the Poisson's ratio $\mu$ (-) of a steel pipe, the tensile strength YS (MPa) of a steel pipe, the compressive strength 0.23% YS (stress at a strain of 0.23%) of a steel pipe, and the compressive strength 0.5% YS (stress at a strain of 0.5%) of a steel pipe.

In the steel pipe collapse strength prediction method pertaining to the first embodiment, steel pipe manufacturing characteristics including the steel pipe shape of a steel pipe to be predicted after steel pipe forming, steel pipe strength characteristics after steel pipe forming, and the pipe-making strain during steel pipe forming are input into a steel pipe collapse strength prediction model. The steel pipe manufacturing characteristics at least include the steel pipe shape after steel pipe forming, steel pipe strength characteristics after steel pipe forming, and the pipe-making strain during steel pipe forming, and other steel pipe manufacturing characteristics such as strength characteristics of a steel sheet before steel pipe forming may be input.

Similarly, in the steel pipe collapse strength prediction method pertaining to the second embodiment, steel pipe manufacturing characteristics including the steel pipe shape of a coated steel pipe to be predicted, after steel pipe forming, steel pipe strength characteristics after steel pipe forming, the pipe-making strain during steel pipe forming, and coating conditions are input into a steel pipe collapse strength prediction model. The steel pipe manufacturing characteristics at least include the steel pipe shape after steel pipe forming, steel pipe strength characteristics after steel pipe forming, the pipe-making strain during steel pipe forming, and coating conditions, and other steel pipe manufacturing characteristics such as strength characteristics of a steel sheet before steel pipe forming may be input.

In the steel pipe collapse strength prediction method pertaining to the first embodiment or the second embodiment, the steel pipe shape after steel pipe forming to be input into a steel pipe collapse strength prediction model is not limited to the maximum outer diameter Dmax (mm) of a steel pipe, the minimum outer diameter Dmin (mm) of a steel pipe, the average outer diameter Dave (mm) of a steel pipe, the average thickness t (mm) of a steel pipe, and the roundness (ovality) fO (%) of the outer circumferential shape of a steel pipe.

In the steel pipe collapse strength prediction method pertaining to the first embodiment or the second embodiment, the steel pipe strength characteristics after steel pipe forming to be input into a steel pipe collapse strength prediction model are not limited to the Young's modulus E (GPa) of a steel pipe, the Poisson's ratio $\mu$ (-) of a steel pipe, the tensile strength YS (MPa) of a steel pipe, the compressive strength 0.23% YS (stress at a strain of 0.23%) of a steel pipe, and the compressive strength 0.5% YS (stress at a strain of 0.5%) of a steel pipe.

In the first embodiment or the second embodiment, the machine learning method is a neural network, and the steel pipe collapse strength prediction model is a prediction model constructed by a neural network, but any machine learning method such as decision tree may be used.

EXAMPLES

To examine the effect of the invention, steel pipe collapse strengths were predicted under the conditions illustrated in Table 1.

TABLE 1

| | No. | Material | Steel pipe characteristics | | | | | Steel pipe shape | | | | |
|---|---|---|---|---|---|---|---|---|---|---|---|---|
| | | | Young's modulus (GPa) | Poisson's ratio (—) | Tensile strength YS (MPa) | Compressive strength 0.23% YS (MPa) | Compressive strength 0.5% YS (MPa) | Average thickness J (mm) | Average outer diameter, Dave (mm) | Minimum outer diameter, Dmin (mm) | Maximum outer diameter, Dmax (mm) | Ovality, fO (%) |
| Ex. | 1 | 1 | 206 | 0.3 | 554 | 366 | 493 | 39.1 | 808.6 | 807.5 | 811.6 | 0.51 |
| Ex. | 2 | 2 | 206 | 0.3 | 536 | 324 | 477 | 39.2 | 808.2 | 807.0 | 810.9 | 0.48 |
| Ex. | 3 | 3 | 206 | 0.3 | 554 | 368 | 493 | 39.1 | 808.6 | 807.5 | 811.6 | 0.51 |
| Ex. | 4 | 4 | 206 | 0.3 | 550 | 378 | 535 | 39.4 | 807.5 | 807.1 | 810.2 | 0.38 |
| Ex. | 5 | 5 | 206 | 0.3 | 492 | 400 | 486 | 39.2 | 809.0 | 808.3 | 809.9 | 0.20 |
| Ex. | 6 | 6 | 206 | 0.3 | 550 | 420 | 546 | 39.1 | 808.6 | 807.6 | 809.4 | 0.22 |
| Comp. Ex. | 1 | 1 | 206 | 0.3 | 554 | — | — | 39.1 | 808.6 | 807.5 | 811.6 | 0.51 |
| Comp. Ex. | 2 | 2 | 206 | 0.3 | 536 | — | — | 39.2 | 808.2 | 807.0 | 810.9 | 0.48 |
| Comp. Ex. | 3 | 3 | 206 | 0.3 | 554 | — | — | 39.1 | 808.6 | 807.5 | 811.6 | 0.51 |
| Comp. Ex. | 4 | 4 | 206 | 0.3 | 550 | — | — | 39.4 | 807.5 | 807.1 | 810.2 | 0.38 |
| Comp. Ex. | 5 | 5 | 206 | 0.3 | 492 | — | — | 39.2 | 809.0 | 808.3 | 809.9 | 0.20 |
| Comp. Ex. | 6 | 6 | 206 | 0.3 | 555 | — | — | 39.1 | 808.6 | 807.6 | 809.4 | 0.22 |

| | No. | Material | Input parameter | | | Experimental result (collapse strength) | | | Prediction result | |
|---|---|---|---|---|---|---|---|---|---|---|
| | | | Pipe-making strain Tensile strain (%) | Coating conditions Maximum temperature (°C.) | Holding time (min) | Predetermined standard value (MPa) | Actual pipe test result (MPa) | Evaluation | Evaluation | Comparison with experimental evaluation |
| Ex. | 1 | 1 | 0.68 | 0 | 0 | 32 | 31.2 | NG | NG | Match |
| Ex. | 2 | 2 | 0.67 | 0 | 0 | 33 | 32.0 | NG | NG | Match |
| Ex. | 3 | 3 | 0.68 | 230 | 3 | 32 | 54.4 | A | A | Match |
| Ex. | 4 | 4 | 0.63 | 230 | 3 | 34 | 46.0 | A | A | Match |
| Ex. | 5 | 5 | 0.60 | 230 | 3 | 33 | 44.7 | A | A | Match |
| Ex. | 6 | 6 | 0.60 | 230 | 3 | 37 | 40.2 | B | B | Match |
| Comp. Ex. | 1 | 1 | — | — | — | 32 | 31.2 | NG | B | Fail to match |
| Comp. Ex. | 2 | 2 | — | — | — | 33 | 32.0 | NG | C | Fail to match |
| Comp. Ex. | 3 | 3 | — | — | — | 32 | 54.4 | A | C | Fail to match |
| Comp. Ex. | 4 | 4 | — | — | — | 34 | 46.0 | A | B | Fail to match |
| Comp. Ex. | 5 | 5 | — | — | — | 33 | 44.7 | A | B | Fail to match |
| Comp. Ex. | 6 | 6 | — | — | — | 37 | 40.2 | C | B | Fail to match |

In Examples 1 and 2, a steel pipe collapse strength prediction model was generated by machine learning of a plurality of learning data including, as input data, the previous steel pipe shape after steel pipe forming (the maximum outer diameter Dmax (mm) of a steel pipe, the minimum outer diameter Dmin (mm) of a steel pipe, the average outer diameter Dave (mm) of a steel pipe, the average thickness t (mm) of a steel pipe, and the roundness (ovality) fO (%) of the outer circumferential shape of a steel pipe), previous steel pipe strength characteristics after steel pipe forming (the Young's modulus E (GPa) of a steel pipe, the Poisson's ratio μ (–) of a steel pipe, the tensile strength YS (MPa) of a steel pipe, the compressive strength 0.23% YS (stress at a strain of 0.23%) of a steel pipe, and the compressive strength 0.5% YS (stress at a strain of 0.5%) of a steel pipe), and the previous pipe-making strain during steel pipe forming (the tensile strain (%) during steel pipe forming) and, as an output datum for the input data, the previous collapse strength (MPa) after steel pipe forming.

In Examples 1 and 2, the steel pipe shape of a steel pipe to be predicted after steel pipe forming (the maximum outer diameter Dmax (mm) of the steel pipe, the minimum outer diameter Dmin (mm) of the steel pipe, the average outer diameter Dave (mm) of the steel pipe, the average thickness t (mm) of the steel pipe, and the roundness (ovality) fO (%) of the outer circumferential shape of the steel pipe), steel pipe strength characteristics after steel pipe forming (the Young's modulus E (GPa) of the steel pipe, the Poisson's ratio μ (–) of the steel pipe, the tensile strength YS (MPa) of the steel pipe, the compressive strength 0.23% YS (stress at a strain of 0.23%) of the steel pipe, and the compressive strength 0.5% YS (stress at a strain of 0.5%) of the steel pipe), and the pipe-making strain during steel pipe forming (the tensile strain (%) during steel pipe forming) illustrated in Table 1 were input into the generated steel pipe collapse strength prediction model to predict the collapse strength after steel pipe forming.

In Examples 1 and 2, the actual collapse strength after steel pipe forming was actually determined (actual pipe test result). The criteria of the actual pipe test results in Examples 1 and 2 were the same as in Examples 3 to 6 and Comparative Examples 1 to 6, and the difference between an actual collapse strength determined in an experiment and a standard value was evaluated. A pipe giving an actual collapse strength lower than the standard value was evaluated as NG; a pipe giving an actual collapse strength higher than the standard value by less than 10% was evaluated as C; a pipe giving an actual collapse strength higher than the standard value by not less than 10% and less than 20% was evaluated as B; and a pipe giving an actual collapse strength higher than the standard value by not less than 20% was evaluated as A. As a result, in Examples 1 and 2, the actually determined collapse strength after steel pipe forming (actual pipe test result) was lower than the standard value (predetermined standard value), and the evaluation result was NG. The predictive value of the collapse strength after steel pipe forming by using the steel pipe collapse strength prediction model was also less than the standard value (predetermined standard value), and the evaluation result was NG, which matched the experimental evaluation.

In Examples 3 to 6, a steel pipe collapse strength prediction model was generated by machine learning of a plurality of learning data including, as input data, the previous steel pipe shape after steel pipe forming (the maximum outer diameter Dmax (mm) of a steel pipe, the minimum outer diameter Dmin (mm) of a steel pipe, the average outer diameter Dave (mm) of a steel pipe, the average thickness t (mm) of a steel pipe, and the roundness (ovality) fO (%) of the outer circumferential shape of a steel pipe), previous steel pipe strength characteristics after steel pipe forming (the Young's modulus E (GPa) of a steel pipe, the Poisson's ratio µ (-) of a steel pipe, the tensile strength YS (MPa) of a steel pipe, the compressive strength 0.23% YS (stress at a strain of 0.23%) of a steel pipe, and the compressive strength 0.5% YS (stress at a strain of 0.5%) of a steel pipe), the previous pipe-making strain during steel pipe forming (the tensile strain (%) during steel pipe forming), and coating conditions (maximum temperature (° C.) and holding time (min)) and, as an output datum for the input data, the previous collapse strength (MPa) of the coated steel pipe.

In Examples 3 to 6, the steel pipe shape of a steel pipe to be predicted after steel pipe forming (the maximum outer diameter Dmax (mm) of the steel pipe, the minimum outer diameter Dmin (mm) of the steel pipe, the average outer diameter Dave (mm) of the steel pipe, the average thickness t (mm) of the steel pipe, and the roundness (ovality) fO (%) of the outer circumferential shape of the steel pipe), steel pipe strength characteristics after steel pipe forming (the Young's modulus E (GPa) of the steel pipe, the Poisson's ratio µ (-) of the steel pipe, the tensile strength YS (Mpa) of the steel pipe, the compressive strength 0.23% YS (stress at a strain of 0.23%) of the steel pipe, and the compressive strength 0.5% YS (stress at a strain of 0.5%) of the steel pipe), the pipe-making strain during steel pipe forming (the tensile strain (%) during steel pipe forming), and coating conditions (the maximum temperature (° C.) and the holding time (min)) illustrated in Table 1 were input into the generated steel pipe collapse strength prediction model to predict the collapse strength of the coated steel pipe.

In Examples 3 to 6, the collapse strength of the coated steel pipe was actually determined (actual pipe test result).

As a result, in Examples 3 to 5, the actually determined collapse strength of the coated steel pipe (actual pipe test result) was higher than the standard value (predetermined standard value) by not less than 20%, and the evaluation result was A. The predictive value of the coated steel pipe collapse strength by using the steel pipe collapse strength prediction model was also higher than the standard value (predetermined standard value) by not less than 20%, and the evaluation result was A, which matched the experimental evaluation. In Example 6, the actually determined collapse strength of the coated steel pipe (actual pipe test result) was higher than the standard value (predetermined standard value) by not less than 10% and less than 20%, and the evaluation result was B. The predictive value of the coated steel pipe collapse strength by using the steel pipe collapse strength prediction model was also higher than the standard value (predetermined standard value) by not less than 10% and less than 20%, and the evaluation result was B, which matched the experimental evaluation.

In Comparative Examples 1 and 2, the steel pipe shape of a steel pipe to be predicted after steel pipe forming (the maximum outer diameter Dmax (mm) of the steel pipe, the minimum outer diameter Dmin (mm) of the steel pipe, the average outer diameter Dave (mm) of the steel pipe, the average thickness t (mm) of the steel pipe, and the roundness (ovality) fO (%) of the outer circumferential shape of the steel pipe) and steel pipe strength characteristics after steel pipe forming (the Young's modulus E (GPa) of the steel pipe, the Poisson's ratio µ (-) of the steel pipe, and the tensile strength (the yield stress at a strain of 0.5%) of the steel pipe) illustrated in Table 1 were input into a prediction formula according to NPL 1 to predict the collapse strength after steel pipe forming.

In Comparative Examples 3 to 6, the steel pipe shape of a coated steel pipe to be predicted after steel pipe forming (the maximum outer diameter Dmax (mm) of the steel pipe, the minimum outer diameter Dmin (mm) of the steel pipe, the average outer diameter Dave (mm) of the steel pipe, the average thickness t (mm) of the steel pipe, and the roundness (ovality) fO (%) of the outer circumferential shape of the steel pipe) and steel pipe strength characteristics after steel pipe forming (the Young's modulus E (GPa) of the steel pipe, the Poisson's ratio µ (-) of the steel pipe, and the tensile strength (the yield stress at a strain of 0.5%) of the steel pipe) illustrated in Table 1 were input into a prediction formula according to NPL 1 to predict the collapse strength of the coated steel pipe.

As a result, in Comparative Example 1, the actually determined collapse strength after steel pipe forming (actual pipe test result) was lower than the standard value (predetermined standard value), and the evaluation result was NG. The predictive value of the collapse strength after steel pipe forming by using the prediction formula according to NPL 1 was higher than the standard value (predetermined standard value) by not less than 10% and less than 20%, and the evaluation result was B. The results differed between them, and the predictive value failed to match the experimental evaluation.

In Comparative Example 2, the actually determined collapse strength after steel pipe forming (actual pipe test result) was lower than the standard value (predetermined standard value), and the evaluation result was NG. The predictive value of the collapse strength after steel pipe forming by using the prediction formula according to NPL 1 was higher than the standard value (predetermined standard value) by less than 10%, and the evaluation result was C. The results differed between them, and the predictive value failed to match the experimental evaluation.

In Comparative Example 3, the actually determined collapse strength after steel pipe forming (actual pipe test result) was higher than the standard value (predetermined standard value) by not less than 20%, and the evaluation result was A. The predictive value of the collapse strength after steel pipe forming by using the prediction formula according to NPL 1 was higher than the standard value (predetermined standard value) by less than 10%, and the evaluation result was C. The results differed between them, and the predictive value failed to match the experimental evaluation.

In Comparative Example 4, the actually determined collapse strength of the coated steel pipe (actual pipe test result) was higher than the standard value (predetermined standard value) by not less than 20%, and the evaluation result was A. The predictive value of the collapse strength of the coated steel pipe by using the prediction formula according to NPL 1 was higher than the standard value (predetermined standard value) by not less than 10% and less than 20%, and the evaluation result was B. The results differed between them, and the predictive value failed to match the experimental evaluation.

In Comparative Example 5, the actually determined collapse strength of the coated steel pipe (actual pipe test result) was higher than the predetermined standard value by not less than 20%, and the evaluation result was A. The predictive value of the collapse strength of the coated steel pipe by using the prediction formula according to NPL 1 was higher than the standard value (predetermined standard value) by not less than 10% and less than 20%, and the evaluation result was B. The results differed between them, and the predictive value failed to match the experimental evaluation.

In Comparative Example 6, the actually determined collapse strength of the coated steel pipe (actual pipe test result) was higher than the standard value (predetermined standard value) by less than 10%, and the evaluation result was C. The predictive value of the collapse strength of the coated steel pipe by using the prediction formula according to NPL 1 was higher than the standard value (predetermined standard value) by not less than 10% and less than 20%, and the evaluation result was B. The results differed between them, and the predictive value failed to match the experimental evaluation.

As described in Examples 1 to 6, in the present invention, the predictive value of the steel pipe collapse strength after steel pipe forming and the predictive value of the coated steel pipe collapse strength each match the experimental results, and this reveals high prediction accuracy.

REFERENCE SIGNS LIST 1 steel pipe manufacturing characteristics determination apparatus
2 arithmetic unit
3 RAM
4 ROM
5 arithmetic processing unit
6 steel pipe collapse strength prediction model generation section
7 steel pipe manufacturing characteristics arithmetic section
8 input unit
9 storage unit
10 output unit
11 bus
41 steel pipe collapse strength prediction model generation program
42 steel pipe manufacturing characteristics calculation program
61 learning data acquisition section
62 preprocessing section
63 model generation section
64 result storage section
71 information read section
72 collapse strength prediction section
73 steel pipe manufacturing characteristics determination section
74 result output section
101 input layer
102 intermediate layer
103 output layer

The invention claimed is:

1. A steel pipe manufacturing method comprising:
performing machine learning of a plurality of learning data that include, as an input datum, a previous steel pipe manufacturing characteristic including a steel pipe shape after steel pipe forming, a steel pipe strength characteristic after steel pipe forming, and a pipe-making strain during steel pipe forming and, as an output datum for the input datum, a previous collapse strength of a steel pipe after steel pipe forming, to generate a steel pipe collapse strength prediction model that predicts a steel pipe collapse strength after steel pipe forming;
forming a steel pipe;
predicting a collapse strength of the formed steel pipe by inputting, into the steel pipe collapse strength prediction model, a steel pipe manufacturing characteristic including a steel pipe shape of the formed steel pipe, a steel pipe strength characteristic of the formed steel pipe, and a pipe-making strain during steel pipe forming, to predict a steel pipe collapse strength of the formed steel pipe; and
assigning the predicted steel pipe collapse strength to the formed steel pipe.

2. The steel pipe manufacturing method according to claim 1, wherein the steel pipe collapse strength prediction model is constructed by a neural network.

3. A steel pipe manufacturing method comprising:
performing machine learning of a plurality of learning data that include, as an input datum, a previous steel pipe manufacturing characteristic including a steel pipe shape after steel pipe forming, a steel pipe strength characteristic after steel pipe forming, and a pipe-making strain during steel pipe forming and, as an output datum for the input datum, a previous collapse strength of a steel pipe after steel pipe forming, to generate a steel pipe collapse strength prediction model that predicts a steel pipe collapse strength after steel pipe forming;
inputting, into the steel pipe collapse strength prediction model, a steel pipe manufacturing characteristic including a steel pipe shape of a steel pipe to be predicted after steel pipe forming, a steel pipe strength characteristic after steel pipe forming, and a pipe-making strain during steel pipe forming, to predict a steel pipe collapse strength after steel pipe forming;
sequentially changing at least one of the steel pipe shape after steel pipe forming, the steel pipe strength characteristic after steel pipe forming, and the pipe-making strain during steel pipe forming included in the steel pipe manufacturing characteristic such that the predicted steel pipe collapse strength after steel pipe forming asymptotically approaches a requested collapse strength of an intended steel pipe after steel pipe forming, to determine an optimum steel pipe manufacturing characteristic;

determining a steel pipe manufacturing condition in accordance with the determined optimum steel pipe manufacturing characteristic; and manufacturing a steel pipe under the determined steel pipe manufacturing condition.

4. The steel pipe manufacturing method according to claim 3, wherein the steel pipe collapse strength prediction model is constructed by a neural network.

5. A steel pipe manufacturing method comprising:

performing machine learning of a plurality of learning data that include, as an input datum, a previous steel pipe manufacturing characteristic including a steel pipe shape after steel pipe forming, a steel pipe strength characteristic after steel pipe forming, a pipe-making strain during steel pipe forming, and a coating condition and, as an output datum for the input datum, a previous collapse strength of a coated steel pipe coated after steel pipe forming, to generate a steel pipe collapse strength prediction model that predicts a collapse strength of a coated steel pipe coated after steel pipe forming;

forming a steel pipe and coating the formed steel pipe to form a coated steel pipe;

predicting a collapse strength of the coated steel pipe by inputting, into the steel pipe collapse strength prediction model, a steel pipe manufacturing characteristic including a steel pipe shape of the coated steel pipe, a steel pipe strength characteristic of the coated steel pipe, a pipe-making strain during steel pipe forming, and a coating condition, to predict a collapse strength of the coated steel pipe; and assigning the predicted coated steel pipe collapse strength to the coated steel pipe.

6. The steel pipe manufacturing method according to claim 5, wherein the steel pipe collapse strength prediction model is constructed by a neural network.

7. A steel pipe manufacturing method comprising:

performing machine learning of a plurality of learning data that include, as an input datum, a previous steel pipe manufacturing characteristic including a steel pipe shape after steel pipe forming, a steel pipe strength characteristic after steel pipe forming, a pipe-making strain during steel pipe forming, and a coating condition and, as an output datum for the input datum, a previous collapse strength of a coated steel pipe coated after steel pipe forming, to generate a steel pipe collapse strength prediction model that predicts a collapse strength of a coated steel pipe coated after steel pipe forming;

inputting, into the steel pipe collapse strength prediction model, a steel pipe manufacturing characteristic including a steel pipe shape of a coated steel pipe to be predicted after steel pipe forming, a steel pipe strength characteristic after steel pipe forming, a pipe-making strain during steel pipe forming, and a coating condition, to predict a collapse strength of a coated steel pipe coated after steel pipe forming;

sequentially changing at least one of the steel pipe shape after steel pipe forming, the steel pipe strength characteristic after steel pipe forming, the pipe-making strain during steel pipe forming, and the coating condition included in the steel pipe manufacturing characteristic such that the predicted collapse strength of the coated steel pipe asymptotically approaches a requested collapse strength of an intended coated steel pipe, to determine an optimum steel pipe manufacturing characteristic;

determining a coated steel pipe manufacturing condition in accordance with the determined optimum steel pipe manufacturing characteristic; and manufacturing a coated steel pipe under the determined coated steel pipe manufacturing condition.

8. The steel pipe manufacturing method according to claim 7, wherein the steel pipe collapse strength prediction model is constructed by a neural network.

* * * * *